(12) United States Patent
Isobata

(10) Patent No.: US 12,486,136 B2
(45) Date of Patent: Dec. 2, 2025

(54) CARRIER-TAPE PROCESSING DEVICE AND CARRIER-TAPE PROCESSING METHOD

(71) Applicant: Panasonic Intellectual Property Management Co., Ltd., Osaka (JP)

(72) Inventor: Yoshinori Isobata, Fukuoka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 525 days.

(21) Appl. No.: 17/905,638

(22) PCT Filed: Jan. 21, 2021

(86) PCT No.: PCT/JP2021/001958
§ 371 (c)(1),
(2) Date: Sep. 5, 2022

(87) PCT Pub. No.: WO2021/192558
PCT Pub. Date: Sep. 30, 2021

(65) Prior Publication Data
US 2023/0114831 A1 Apr. 13, 2023

(30) Foreign Application Priority Data
Mar. 25, 2020 (JP) .................... 2020-053535

(51) Int. Cl.
*B65H 35/00* (2006.01)
*B65H 75/18* (2006.01)
*H05K 13/08* (2006.01)

(52) U.S. Cl.
CPC ....... *B65H 35/0066* (2013.01); *B65H 75/182* (2013.01); *H05K 13/086* (2018.08);
(Continued)

(58) Field of Classification Search
CPC .............. B65H 35/0066; B65H 75/182; B65H 2301/41446; B65H 2701/1942;
(Continued)

(56) References Cited

U.S. PATENT DOCUMENTS

| 6,098,915 A * | 8/2000 | Nakae | B65H 19/29 242/535 |
| 6,405,969 B1 * | 6/2002 | Ogren | B65H 75/08 242/530.4 |

(Continued)

FOREIGN PATENT DOCUMENTS

| JP | 53-077780 U | 6/1978 |
| JP | 62-028377 | 2/1987 |

(Continued)

OTHER PUBLICATIONS

Campbell J.L. et al., Tape Insertion and Leader Block Attachment, published on Feb. 1, 1986 (Year: 1986).*
(Continued)

*Primary Examiner* — Eric J Yoon
(74) *Attorney, Agent, or Firm* — McDonald Hopkins LLC

(57) ABSTRACT

There are provided a carrier tape supply unit that supplies a carrier tape storing components, and a carrier tape processing unit that pulls out the carrier tape from the carrier tape supply unit, forms the carrier tape into a roll shape, and stores the carrier tape in a case. Further, the carrier tape processing unit includes a roll body creating unit that includes a shaft member holding a tip end part of the carrier tape, and creates a roll-shaped roll body by rotating the shaft member to wind the carrier tape around the shaft member, and a shaft member extracting unit that extracts the shaft member from the roll body created by the roll body creating unit.

16 Claims, 20 Drawing Sheets

(52) U.S. Cl.
CPC ............. *B65H 2301/41446* (2013.01); *B65H 2701/1942* (2013.01)

(58) Field of Classification Search
CPC ...... B65H 18/28; B65H 35/002; B65H 21/00; H05K 13/086; H05K 13/0419; H05K 13/0084
See application file for complete search history.

(56) References Cited

U.S. PATENT DOCUMENTS

| | | | |
|---|---|---|---|
| 2006/0054681 A1* | 3/2006 | Park ...................... | G06K 17/00 235/375 |
| 2007/0126578 A1* | 6/2007 | Broussard ............ | G06Q 10/087 705/28 |
| 2013/0074447 A1* | 3/2013 | Kim .................... | H01L 21/6835 242/526 |
| 2015/0166286 A1* | 6/2015 | Morris .................... | B29B 17/00 242/533.8 |
| 2021/0020474 A1* | 1/2021 | Ng ....................... | H05K 13/021 |
| 2022/0162028 A1 | 5/2022 | Isobata | |

FOREIGN PATENT DOCUMENTS

| | | |
|---|---|---|
| JP | 5-021990 | 1/1993 |
| JP | 2006-114764 | 4/2006 |
| JP | 2015-076466 A | 4/2015 |
| WO | 2020/202737 | 10/2020 |

OTHER PUBLICATIONS

International Search Report of PCT application No. PCT/JP2021/001958 dated Apr. 13, 2021.
English Translation of Chinese Search Report dated Dec. 24, 2024 for the related Chinese Patent Application No. 202180017847.9.

* cited by examiner

CARRIER-TAPE PROCESSING DEVICE AND CARRIER-TAPE PROCESSING METHOD

TECHNICAL FIELD

The present disclosure relates to a carrier tape processing device and a carrier tape processing method for processing a carrier tape storing components.

BACKGROUND ART

Conventionally, as a component supply unit in a component mounting device in which a component is mounted on a substrate, a tape feeder that supplies a component to a component extraction position by conveying a carrier tape storing the component is known. The carrier tape used in the tape feeder is wound around a reel as a holding body thereof, and transportation and storage of the carrier tape, setting of the carrier tape with respect to the component supply unit, and the like are performed in a state of being wound around the reel (in a state of being a roll body with reel).

In such a tape feeder, a reel is a standard product, and it is difficult to reduce a size in a width direction of the reel, and an empty reel is generated after the use of the carrier tape is finished, and it takes time and effort to process and store the reel. For this reason, there has been proposed a device capable of supplying a carrier tape to a component supply unit in a state of a roll body in which a reel is eliminated and the carrier tape is wound in a roll shape (for example, PTL 1 below). In PTL 1, a roll body of a carrier tape is put into a storage part of a component supply unit from means for refilling components (component supply means), and an unnecessary reel does not remain at a mounting work site after the component supply unit finishes pulling out the carrier tape.

CITATION LIST

Patent Literature

PTL 1: Unexamined Japanese Patent Publication No. H5-21990

SUMMARY OF THE INVENTION

Therefore, an object of the present disclosure is to provide a carrier tape processing device and a carrier tape processing method capable of realizing a component supply form without a reel with an inexpensive configuration.

A carrier tape processing device of the present disclosure includes a carrier tape supply unit that supplies a carrier tape storing components, a carrier tape processing unit that pulls out the carrier tape from the carrier tape supply unit, forms the carrier tape into a roll shape, and stores the carrier tape in a case, and a writing unit that writes information, regarding the ponents stored in the carrier tape, in a radio tag provided on the case.

A carrier tape processing method of the present disclosure includes a carrier tape pulling-out step of pulling out a carrier tape from a carrier tape supply unit that supplies the carrier tape storing components, and a carrier tape processing step of forming the carrier tape pulled out in the carrier tape pulling-out step into a roll shape, and storing the carrier tape in a case, and a writing step of writing information, regarding the components stored in the carrier tape, in a radio tag provided on the case.

According to the present disclosure, a component supply form without a reel can be realized with an inexpensive configuration.

DESCRIPTION OF EMBODIMENT

Before describing exemplary embodiments of the present disclosure, a problem in a conventional device will be briefly described.

The device described in PTL 1 requires a large-scale device (component supply means) for supplying the roll body of the carrier tape to the component supply unit, and has a problem of cost.

Figure 1:
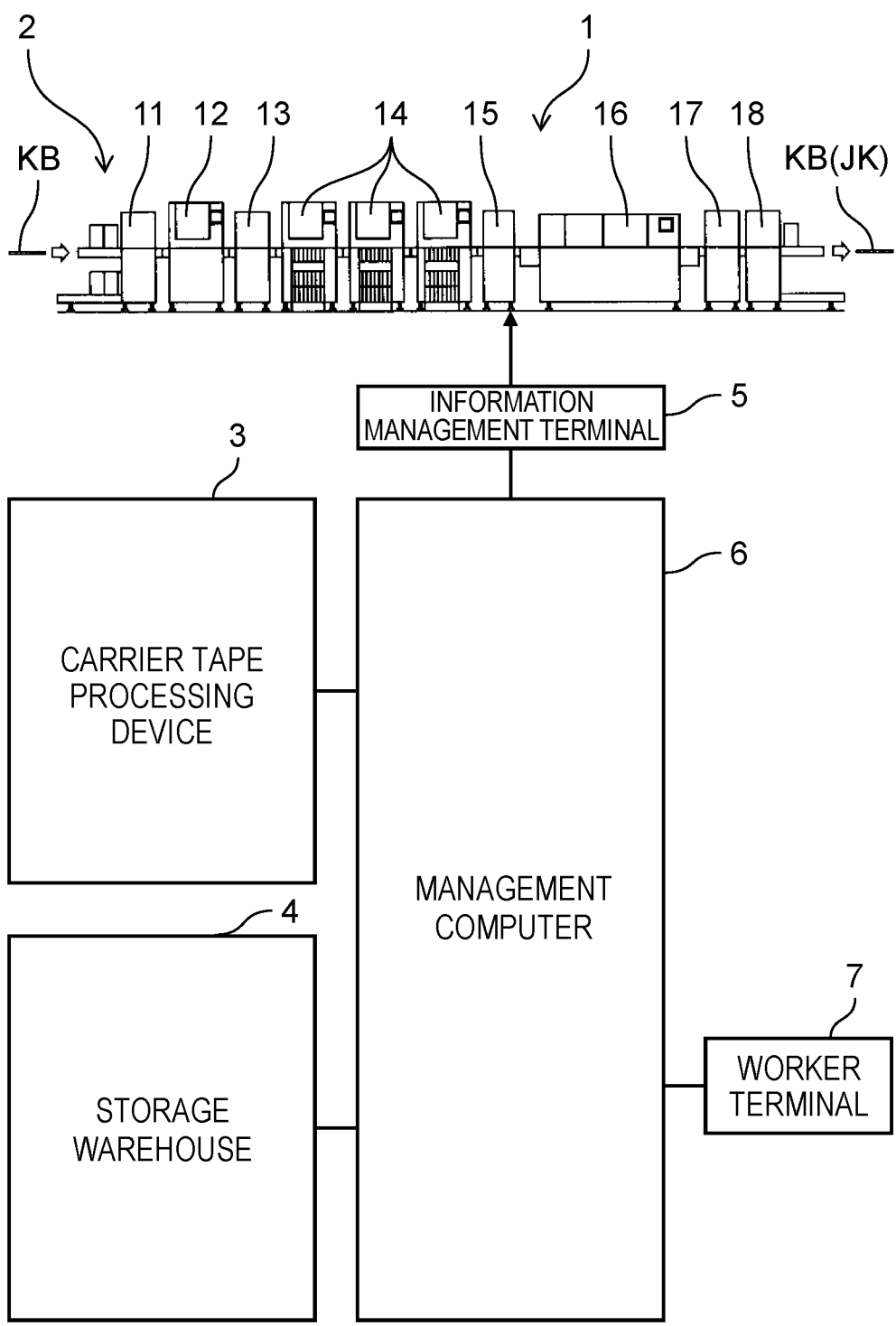
FIG. 1 is a schematic configuration diagram of a component mounting system according to an exemplary embodiment of the present disclosure.

Hereinafter, an exemplary embodiment of the present disclosure will be described with reference to the drawings. FIG. 1 is a configuration diagram of component mounting system 1 including a carrier tape processing device according to an exemplary embodiment of the present disclosure. Component mounting system 1 includes manufacturing line 2, carrier tape processing device 3 related to supply of components supplied to manufacturing line 2, and storage warehouse 4 related to storage and management of components. Manufacturing line 2 manufactures mounting substrate JK in which components are mounted on substrate KB by performing work while transferring KB between a plurality of devices connected in series.

In FIG. 1, manufacturing line 2 is connected to management computer 6 through information management terminal 5. Management computer 6 manages an operation of each device constituting manufacturing line 2. Further, as illustrated in FIG. 1, carrier tape processing device 3 and storage warehouse 4 are also connected to management computer 6. Management computer 6 also manages operations of carrier tape processing device 3 and storage warehouse 4. As illustrated in FIG. 1, worker terminal 7 is connected to management computer 6, and a worker of component mounting system 1 can perform various operation inputs from worker terminal 7 to component mounting system 1.

First, manufacturing line 2 will be described. In FIG. 1, manufacturing line 2 includes substrate supply device 11, printing device 12, post-printing inspection device 13, a plurality of component mounting devices 14, post-mounting inspection device 15, reflow device 16, final inspection device 17, and substrate recovery device 18.

Substrate supply device 11 sequentially supplies substrate KB to printing device 12 on a downstream side. Printing device 12 carries in substrate KB supplied from substrate supply device 11, applies paste solder to an electrode formed on a surface of substrate KB, and carries out substrate KB to post-printing inspection device 13 on the downstream side. Post-printing inspection device 13 carries in substrate KB carried out from printing device 12, and inspects substrate KB by observing with a camera whether or not there is a place with a defective solder application state, and then carries out substrate KB to component mounting devices 14 on the downstream side.

Each of component mounting devices 14 mounts the component on substrate KB carried in from an upstream side and carries out the component to the downstream side. Component mounting device 14 located on the most downstream side carries out substrate KB to post-mounting inspection device 15 located on the downstream side. Component mounting device 14 will be described later.

Post-mounting inspection device 15 carries in substrate KB carried out from component mounting device 14 located on the most downstream side, inspects substrate KB by observing with a camera whether or not there is a place where the component is mounted in a defective state, and then carries out substrate KB to reflow device 16 on the downstream side. Reflow device 16 carries in substrate KB carried out from post-mounting inspection device 15, and causes substrate KB to pass through a reflow furnace to melt and solidify the solder, thereby bonding the component to the electrode. Final inspection device 17 carries in substrate KB that has passed through reflow device 16, observes the bonding state of the component to the electrode with a camera to inspect the bonding state, and then carries out substrate KB to substrate recovery device 18 on the downstream side. Substrate recovery device 18 receives and recovers substrate KB carried out from final inspecting device 17.

Figure 2:
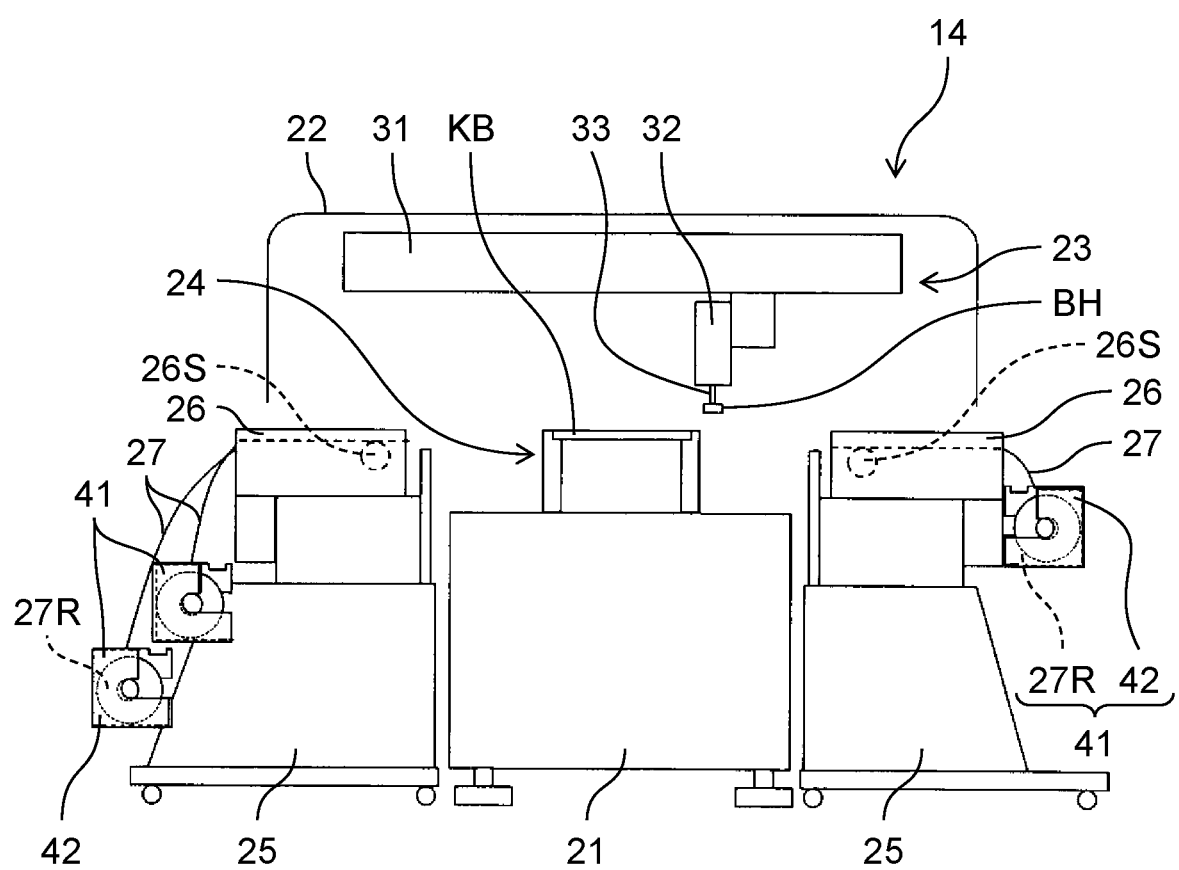
FIG. 2 is a side view of a component mounting device included in the component mounting system according to the exemplary embodiment of the present disclosure.

Next, component mounting device 14 will be described with reference to FIG. 2. In FIG. 2, base cover 22 is provided on base 21 of component mounting device 14, and substrate transport path 24 that conveys substrate KB in a horizontal direction is provided in working space 23 between base 21 and base cover 22.

Feeder carriages 25 are connected to positions on both sides of substrate transport path 24 on base 21. A plurality of component supply units 26 are attached to each of feeder carriages 25. Here, component supply unit 26 is a tape feeder, and supplies components BH one by one to a predetermined component supply position by conveying carrier tape 27 by sprocket 26S.

In FIG. 2, mounting head 32 that is moved in a horizontal plane direction by head moving mechanism 31 is provided in working space 23. Component suction nozzle 33 is provided to extend downward in mounting head 32. Component BH supplied by component supply unit 26 is sucked to a lower end of component suction nozzle 33.

When substrate transport path 24 carries in substrate KB from the upstream side and positions substrate KB, each component mounting device 14 causes mounting head 32 to repeatedly perform the mounting turn while causing component supply unit 26 to supply component BH. In one mounting turn, mounting head 32 performs an operation of sucking and picking up component BH supplied by component supply unit 26 and an operation of mounting component BH at a predetermined component mounting position on substrate KB in this order. When all components BH to be mounted on substrate KB are mounted by repeatedly performing the mounting turns on mounting head 32, substrate transport path 24 is operated to carry out substrate KB to the downstream side.

Here, in the present exemplary embodiment, carrier tape 27 used by component mounting device 14 for supplying component BH is fed out from roll body 41 in a case. Here, "roll body 41 in a case" refers to roll body 27R in which carrier tape 27 is rolled and stored in case 42 (see also FIG. 3). Roll body 41 in a case is different from a roll body with a reel conventionally used. Here, the "roll body with a reel" refers to one in which roll body 27R is held by the reel.

Figure 4A:
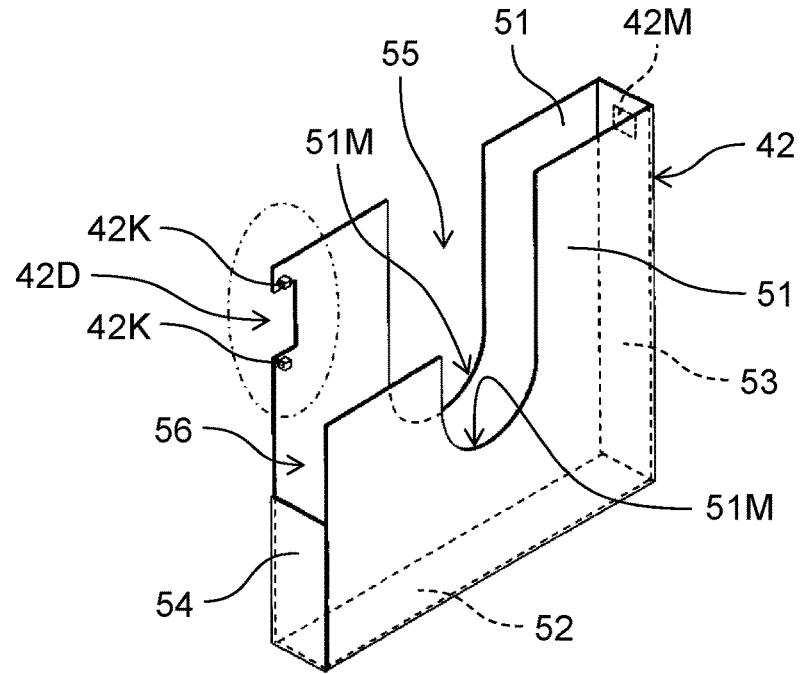
FIG. 4A is a perspective view of a case used when a carrier tape processing device according to the exemplary embodiment of the present disclosure manufactures a roll body in a case.
Figure 4B:
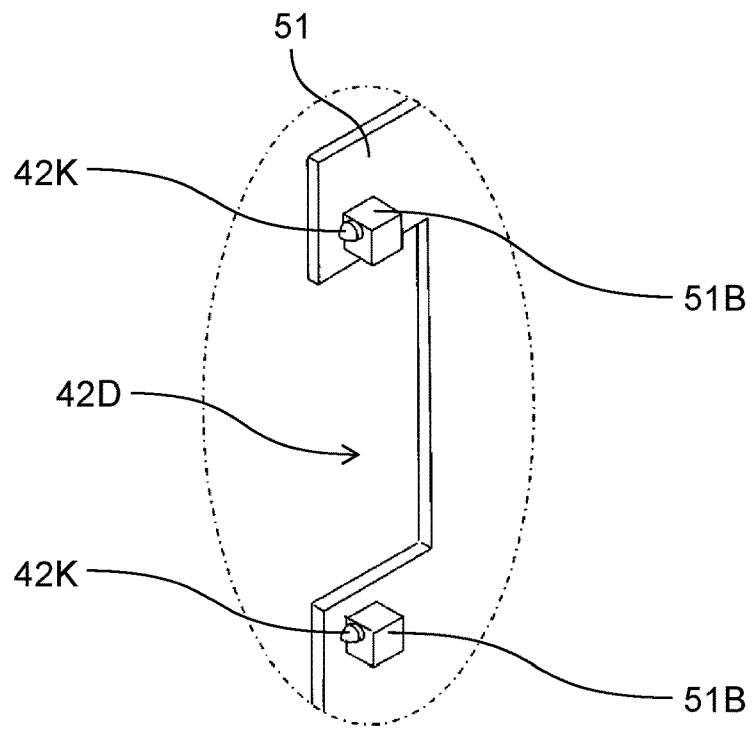
FIG. 4B is a partially enlarged view of a case used when the carrier tape processing device according to the exemplary embodiment of the present disclosure manufactures the roll body in a case.

Here, case 42 of roll body 41 in a case will be described. As illustrated in FIG. 4A, case 42 includes left and right side walls 51, bottom wall 52, front wall 53, and rear wall 54, and has upper opening 55 and rear opening 56. Radio tag 42M is attached to an outer surface of front wall 53. Two upper and lower projection bases 51B projecting inward from an inner surface of one of side walls 51 are provided on an upper part of rear wall 54, and two projection bases 51B are provided with tape tip end holding parts 42K projecting outward in the horizontal direction (FIG. 4B). Side wall 51 on which protrusion base 51B is provided includes cutout part 42D in which a part sandwiched between two protrusion bases 51B is cut out. Left and right side walls 51 of case 42 are provided with groove parts 51M extending in a U shape from the edge parts on a side of upper opening 55 toward a side of the central parts of respective side walls 51.

Figure 5A:
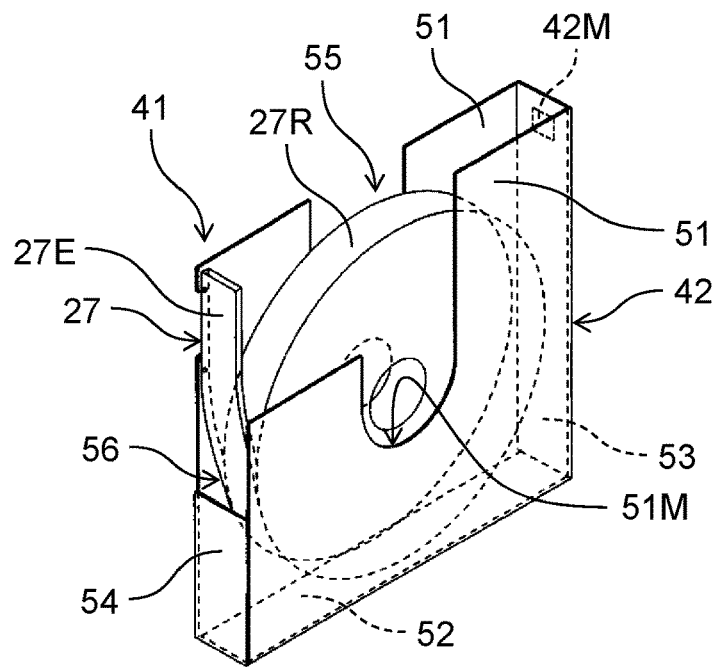
FIG. 5A is a perspective view of a roll body in a case manufactured by the carrier tape processing device according to the exemplary embodiment of the present disclosure.
Figure 5B:
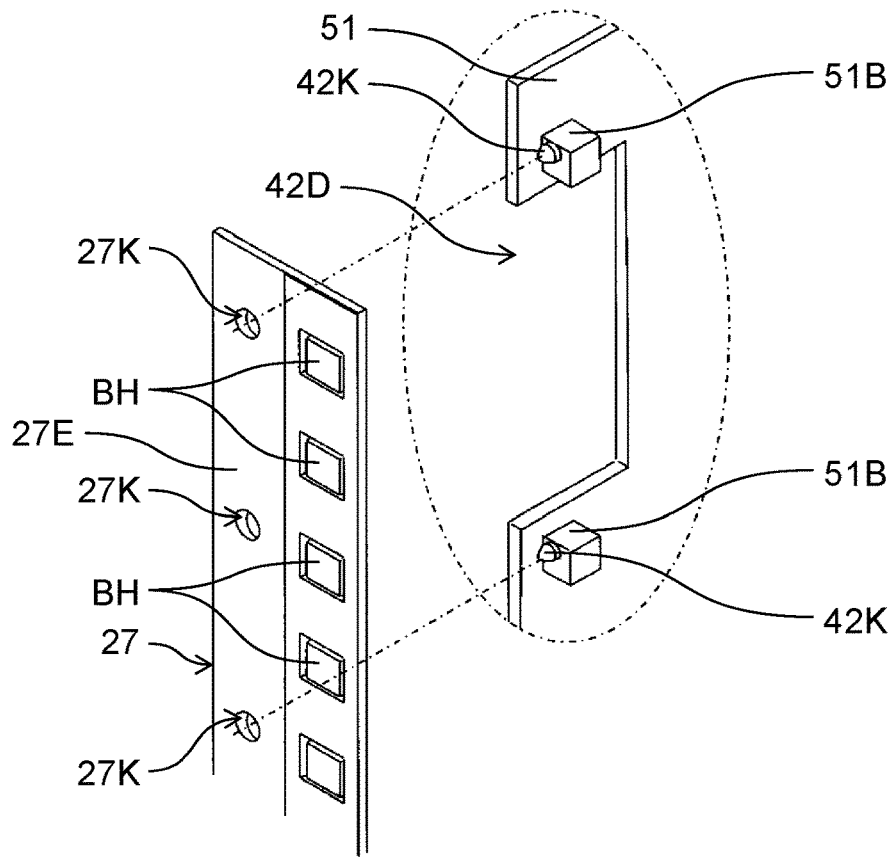
FIG. 5B is a partially enlarged view of the roll body in a case manufactured by the carrier tape processing device according to the exemplary embodiment of the present disclosure.

As illustrated in FIGS. 5A and 5B, when roll body 41 in a case is stored or transported, tape tip end holding part 42K provided in case 42 is inserted into feed hole 27K (hole engaged with an outer peripheral teeth of sprocket 26S) of carrier tape 27 to be locked. Note that the case where roll body 41 in a case is stored or transported refers to a case where roll body 27R is stored in case 42, and a case where carrier tape 27 is not pulled out from roll body 27R to be used. In the present exemplary embodiment, two tape tip end holding parts 42K provided in case 42 are inserted into and locked to two feed holes 27K. This prevents carrier tape 27 from coming off from case 42 of roll body 41 in a case during storage or transportation, and thus prevents entire roll body 27R from falling off from case 42.

Figure 3:
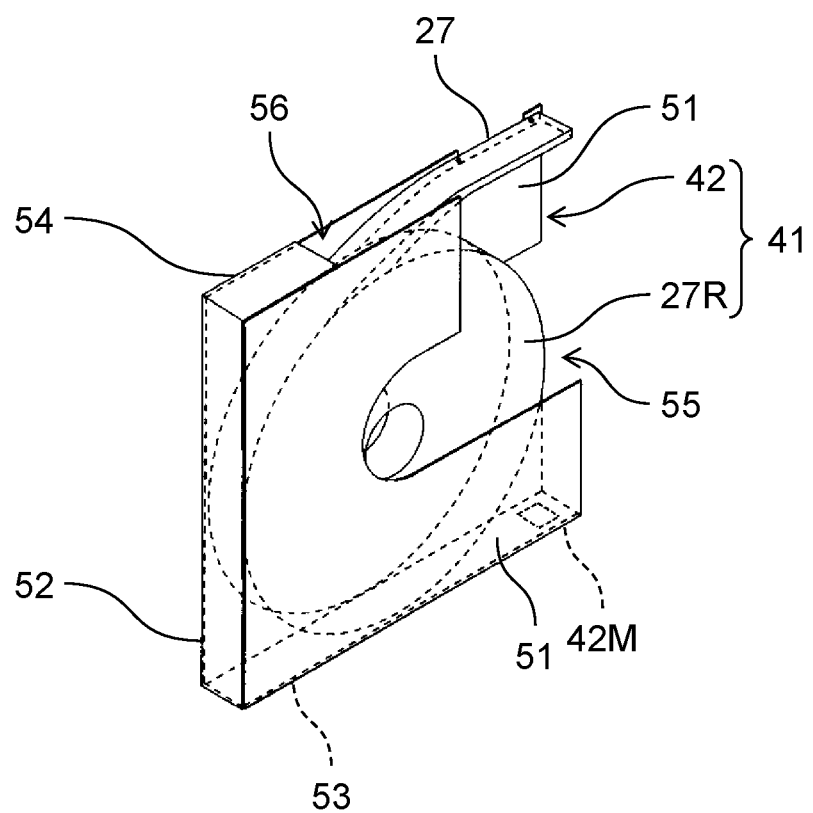
FIG. 3 is a perspective view of a roll body in a case used in the component mounting device according to the exemplary embodiment of the present disclosure.

On the other hand, when carrier tape 27 is pulled out from roll body 41 in a case for use, two tape tip end holding parts 42K are removed from feed hole 27K of carrier tape 27, and furthermore, front wall 53 is brought into an attitude to be a lower surface as illustrated in FIG. 3. Carrier tape 27 can be fed to component supply unit 26 by pulling out carrier tape 27 from rear opening 56 in such an attitude that front wall 53 is a lower surface. As described above, by providing tape tip end holding part 42K in case 42, a position of a tip end part of carrier tape 27 in case 42 is unified, so that the operation of taking out the tip end part of carrier tape 27 from case 42 can be easily performed. Further, it is possible to easily cope with a case where the work of taking out the tip end part of carrier tape 27 is performed by an automated facility such as a robot.

Figure 6A:
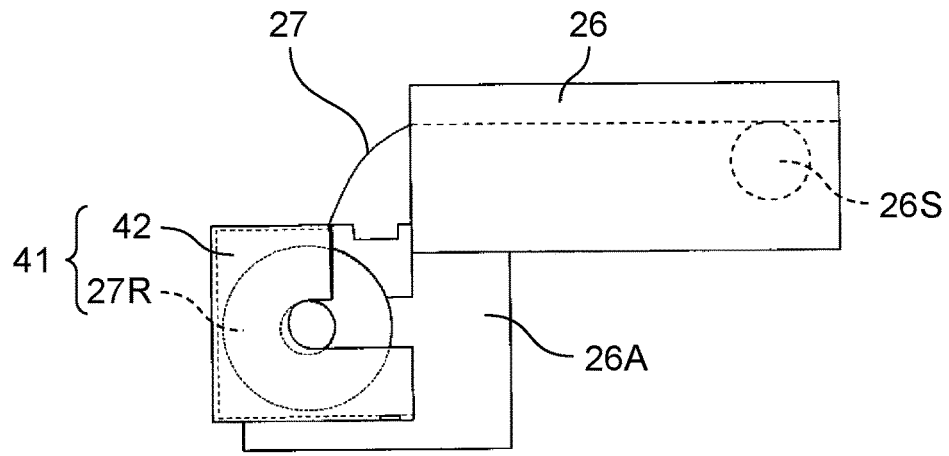
FIG. 6A is a diagram illustrating a usage mode of the roll body in a case manufactured by the carrier tape processing device according to the exemplary embodiment of the present disclosure.
Figure 6B:
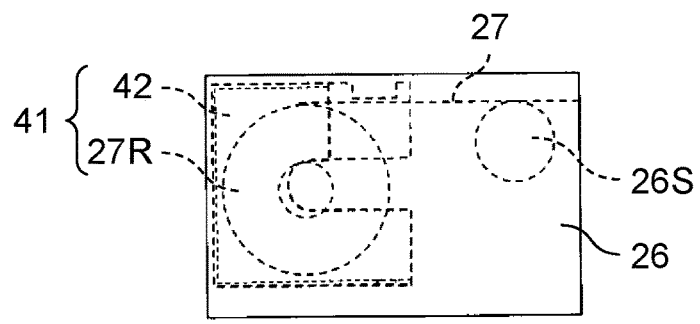
FIG. 6B is a diagram illustrating a usage mode of the roll body in a case manufactured by the carrier tape treatment device according to the exemplary embodiment of the present disclosure.
Figure 6C:
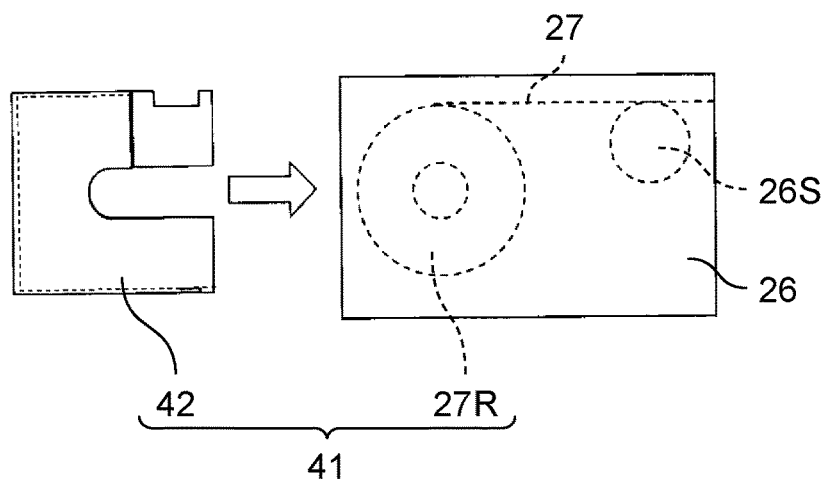
FIG. 6C is a diagram illustrating a usage mode of the roll body in a case manufactured by the carrier tape processing device according to the exemplary embodiment of the present disclosure.

As a usage mode of roll body 41 in a case with respect to component supply unit 26, for example, there is a mode of being attached to feeder carriage 25 as in roll body 41 in a case illustrated on a left side of FIG. 2, and a mode of being attached to component supply unit 26 via attachment 26A as in roll body 41 in a case illustrated on a right side of FIG. 2 and FIG. 6A. Alternatively, as illustrated in FIG. 6B, there is also a mode in which entire roll body 41 in a case is stored inside component supply unit 26. Alternatively, as illustrated in FIG. 6C, there is also a mode in which roll body 27R is taken out from roll body 41 in a case, and only roll body 27R is stored inside component supply unit 26.

As described above, in the present exemplary embodiment, case 42 of roll body 41 in a case can have a role of a support means of roll body 27R when roll body 27R is installed outside component supply unit 26 to be used (a role of a reel in a conventional roll body with a reel).

Figure 7:
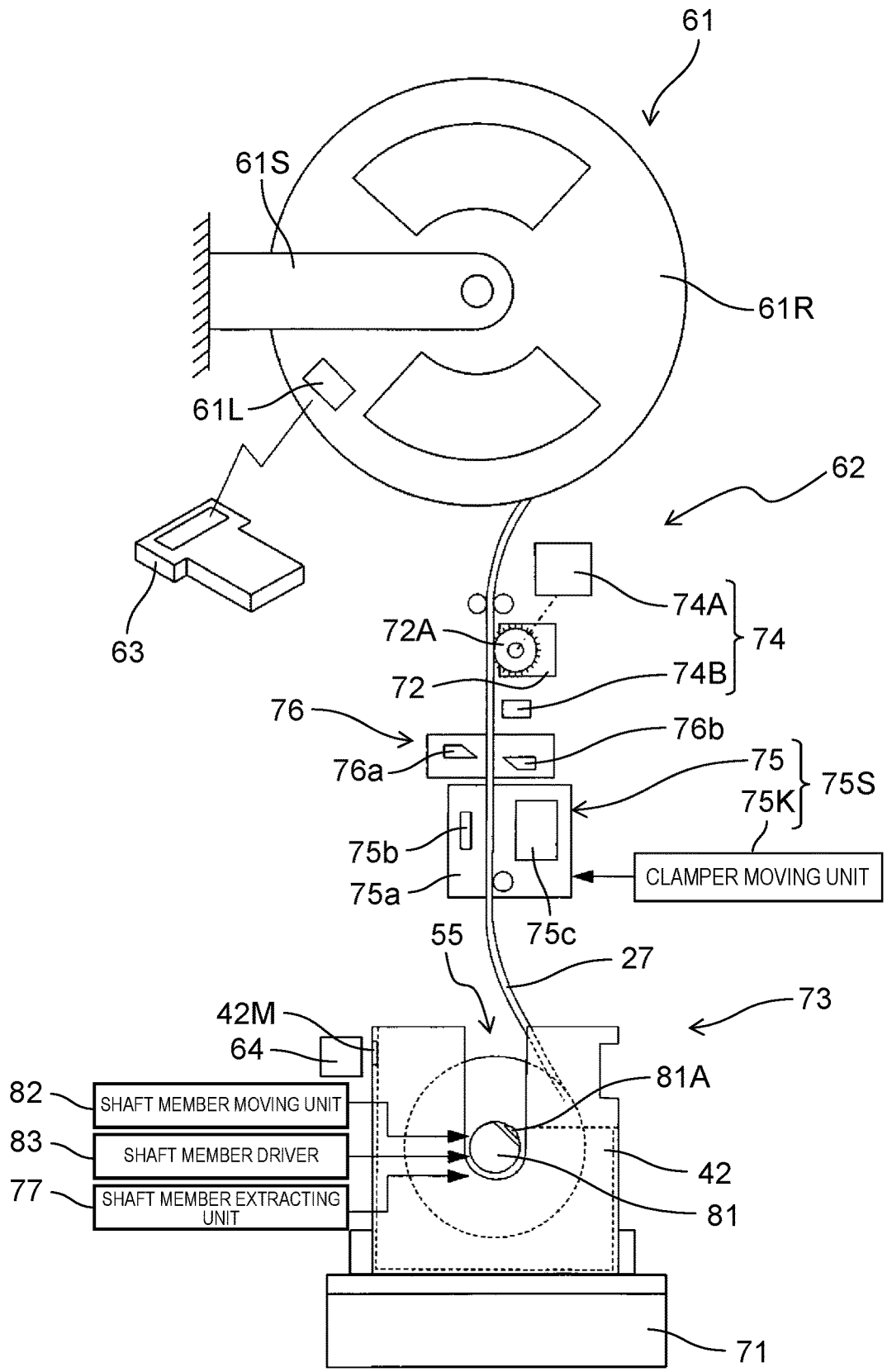
FIG. 7 is a side view of the carrier tape processing device according to the exemplary embodiment of the present disclosure.

Next, carrier tape processing device 3 will be described. Carrier tape processing device 3 is a device that processes carrier tape 27 used in component mounting device 14 to manufacture roll body 41 in a case. As illustrated in FIG. 7, carrier tape processing device 3 includes carrier tape supply unit 61 that supplies carrier tape 27 storing component BH, carrier tape processing unit 62 that pulls out carrier tape 27 from carrier tape supply unit 61, forms the carrier tape into a roll shape, and stores the carrier tape in case 42, handy scanner 63, and writing unit 64.

In FIG. 7, carrier tape supply unit 61 includes reel 61R around which carrier tape 27 storing component BH is wound, and reel support unit 61S rotatably supporting reel 61R. Code label 61L on which information (component information) of component BH stored in carrier tape 27 is recorded is attached to reel 61R. An identifier (symbol) such as a barcode or a two-dimensional code is printed on a surface of code label 61L. Carrier tape 27 is wound around reel 61R in a direction opposite to the normal direction. In the case of a paper tape carrier tape having a width of 8 mm, when carrier tape 27 is pulled out from reel 61R to the front, feed hole 27K appears on the left side, but appears on the right side in a reel (hereinafter, it is referred to as a normal reel) capable of directly supplying carrier tape 27 to component supply unit 26. This is for making the orientation of carrier tape 27 of roll body 27R created by roll body creating unit 73 described later the same as that of the normal reel.

In FIG. 7, carrier tape processing unit 62 includes case holding unit 71, carrier tape feeding unit 72, roll body creating unit 73, measurement unit 74, clamper 75, cutter 76, and shaft member extracting unit 77.

Case holding unit 71 includes a conveyor mechanism extending in a horizontal case conveyance direction (a direction perpendicular to the paper surface of FIG. 7). Case holding unit 71 holds each of the plurality of cases 42 in a state of being arranged in a line such that upper opening 55 faces upward, and intermittently conveys the plurality of cases in the case conveyance direction.

Carrier tape feeding unit 72 performs a feeding operation of feeding carrier tape 27 fed from reel 61R of carrier tape supply unit 61 downward (that is, to case 42 held by case holding unit 71).

Figure 8:
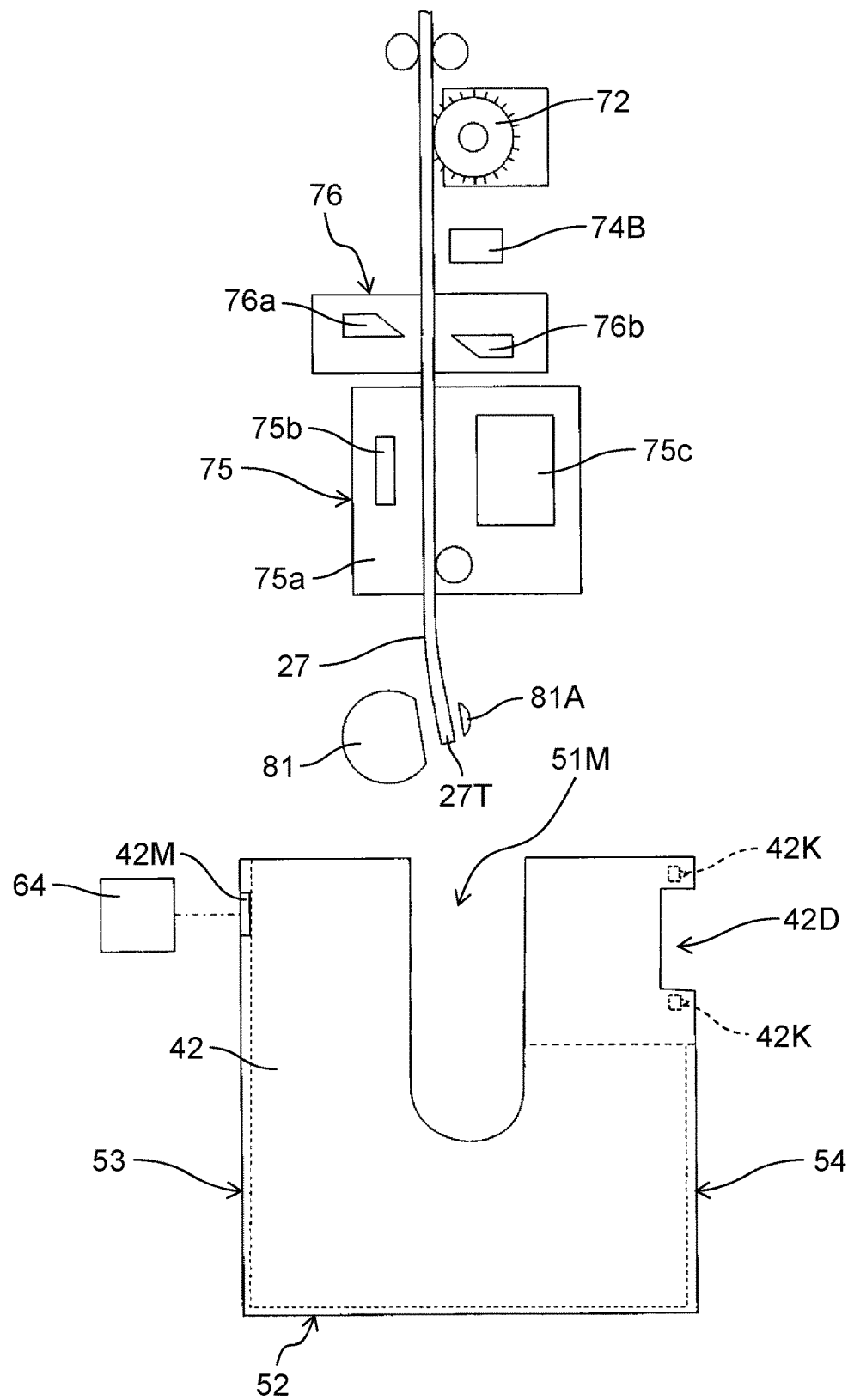
FIG. 8 is an operation explanatory diagram of the carrier tape processing device according to the exemplary embodiment of the present disclosure.
Figure 9:
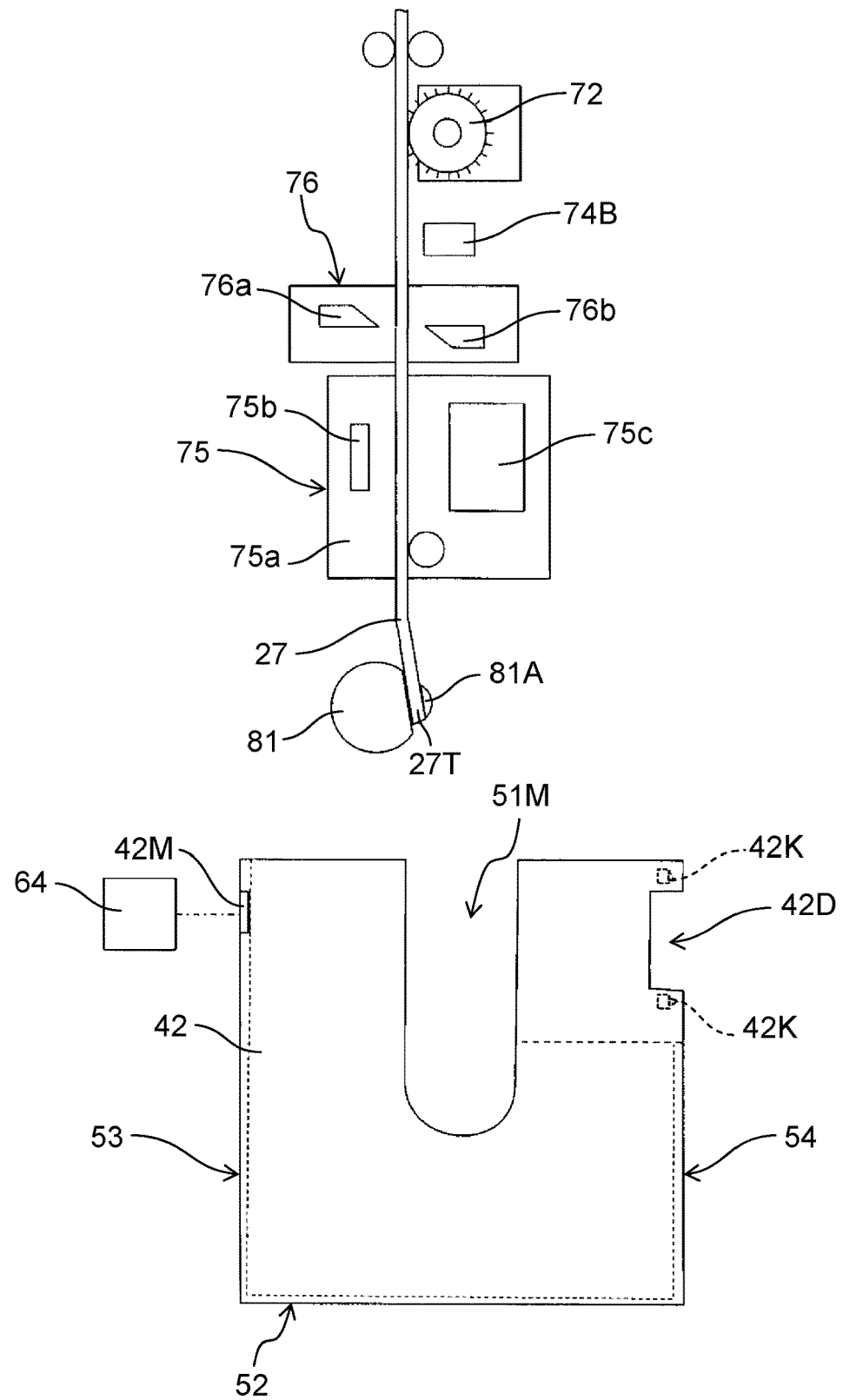
FIG. 9 is an operation explanatory diagram of the carrier tape processing device according to the exemplary embodiment of the present disclosure.

In FIG. 7, roll body creating unit 73 includes shaft member 81, shaft member moving unit 82, and shaft member driver 83. Shaft member 81 is provided rotatably around a horizontal axis. Shaft member 81 is provided with chuck part 81A, and tip end part 27T of carrier tape 27 can be sandwiched by chuck part 81A (FIG. 8→FIG. 9).

Figure 10:
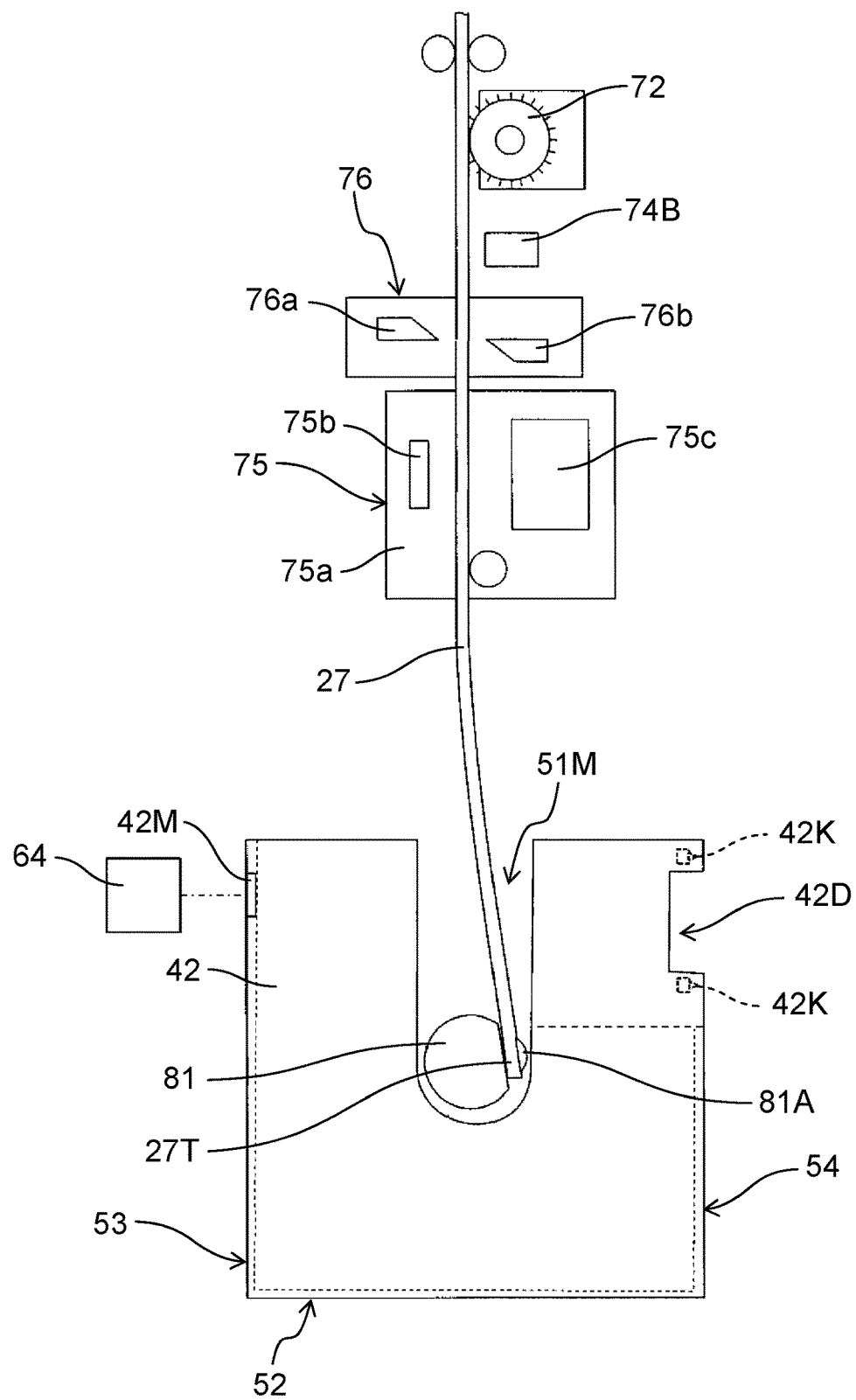
FIG. 10 is an operation explanatory diagram of the carrier tape processing device according to the exemplary embodiment of the present disclosure.

Shaft member moving unit 82 has a function of moving shaft member 81 in which tip end part 27T of carrier tape 27 is sandwiched by chuck part 81A between a position above case 42 (FIG. 9) and a position in groove part 51M of case 42 (referred to as "in-case position". FIG. 10). Shaft member driver 83 rotates shaft member 81 in a state where shaft member 81 is moved to the in-case position by shaft member moving unit 82 (arrow R illustrated in FIG. 11). As a result, carrier tape 27 is wound around shaft member 81.

As described above, roll body creating unit 73 includes shaft member 81 that holds tip end part 27T of carrier tape 27, and is configured to wind carrier tape 27 around shaft member 81 by rotating shaft member 81 to form roll-shaped roll body 27R.

In FIG. 7, measurement unit 74 includes length sensor 74A and component counter 74B. Length sensor 74A measures a length of carrier tape 27 pulled out from carrier tape supply unit 61 by carrier tape feeding unit 72 based on an operation amount of carrier tape feeding unit 72. Carrier tape feeding unit 72 includes sprocket 72A for feeding out carrier tape 27, and length sensor 74A detects a rotation amount of sprocket 72A by an encoder or the like and measures the length of pulled out carrier tape 27. Component counter 74B is located below length sensor 74A, and counts the number of components BH pulled out from carrier tape supply unit 61.

Figure 11:
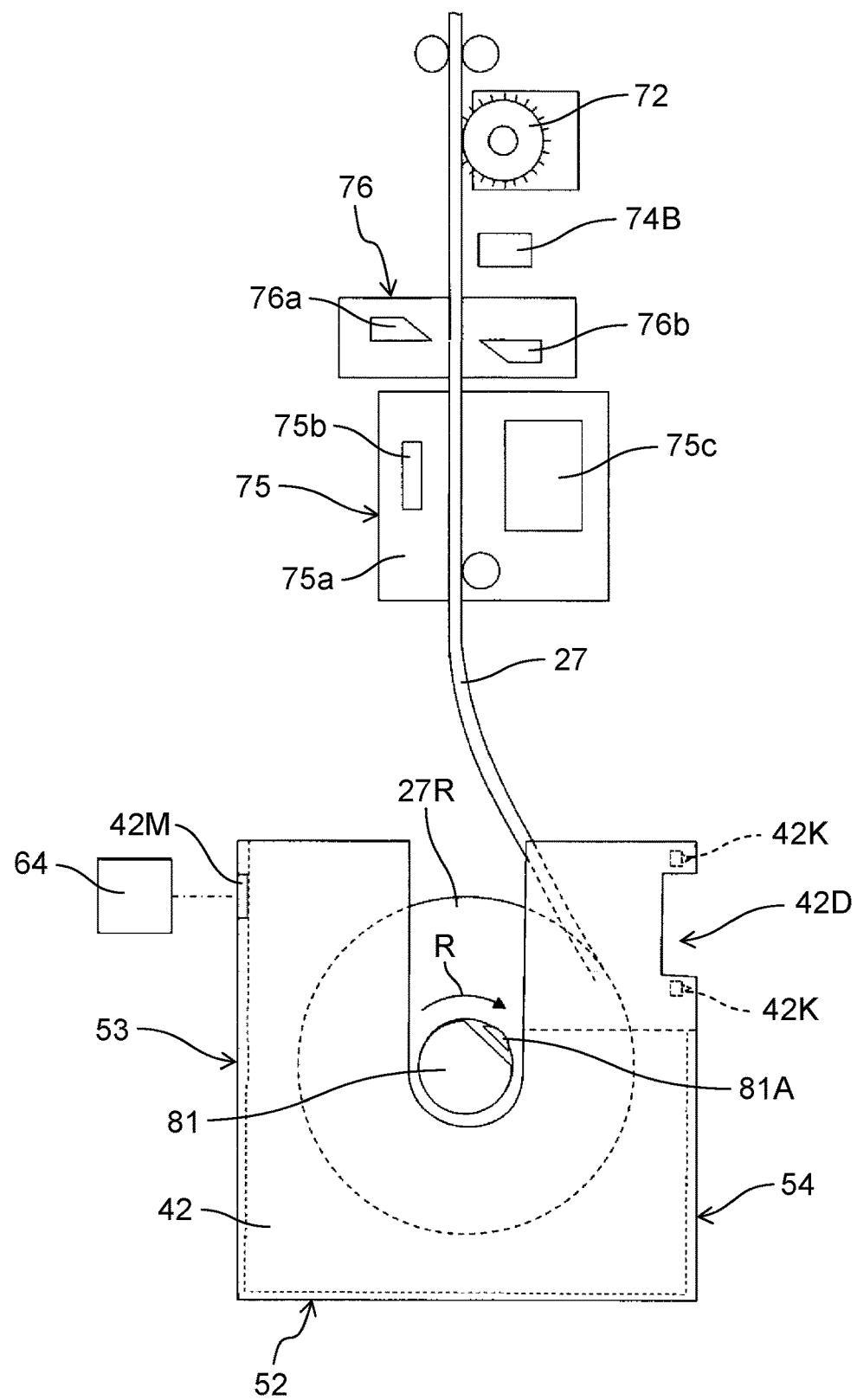
FIG. 11 is an operation explanatory diagram of the carrier tape processing device according to the exemplary embodiment of the present disclosure.
Figure 12:
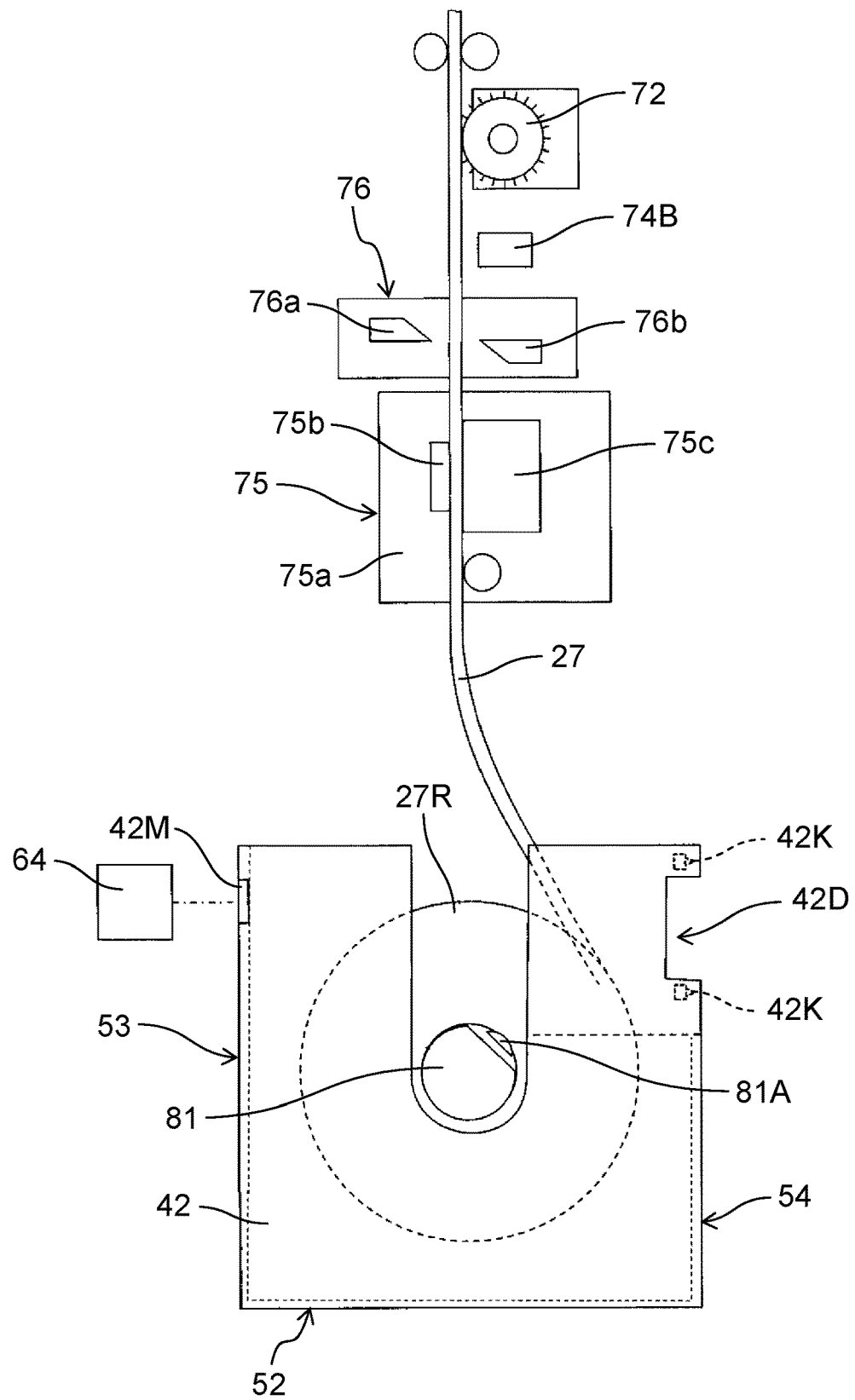
FIG. 12 is an operation explanatory diagram of the carrier tape processing device according to the exemplary embodiment of the present disclosure.

In FIG. 7, clamper 75 is provided below component counter 74B. Clamper 75 includes a pair of clamp members 75b, 75c on base part 75a. The pair of clamp members 75b, 75c move close to each other to clamp carrier tape 27 positioned between the pair of clamp members 75b, 75c (FIG. 11→FIG. 12).

Figure 13:
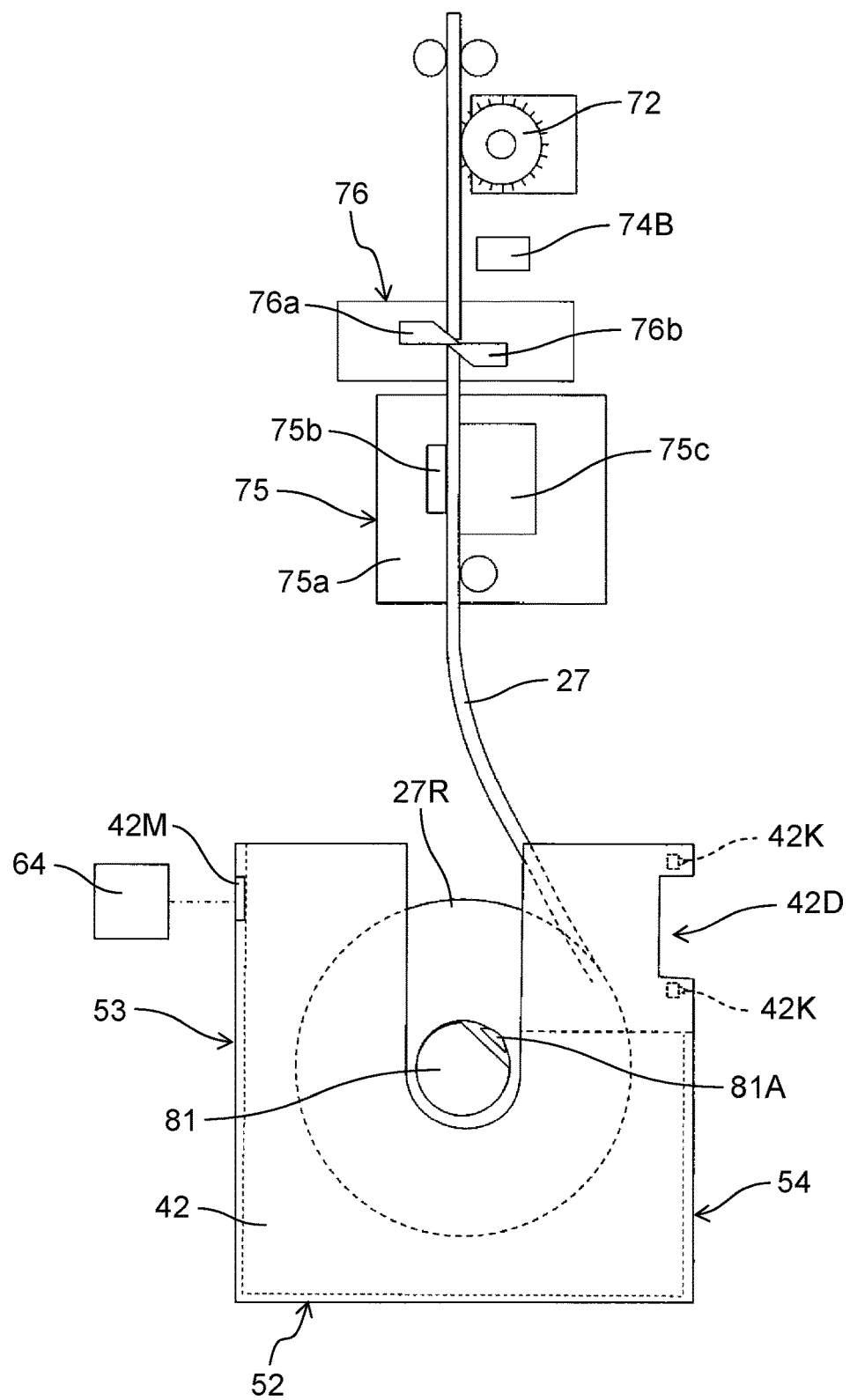
FIG. 13 is an operation explanatory diagram of the carrier tape processing device according to the exemplary embodiment of the present disclosure.

In FIG. 7, cutter 76 is provided between component counter 74B and clamper 75, and two cutting members 76a, 76b are arranged with their blade surfaces facing each other. Two cutting members 76a, 76b are moved in a direction of approaching each other to cut carrier tape 27 extending downward between two cutting members 76a, 76b and clamped by clamper 75 (FIG. 12→FIG. 13).

Figure 14A:
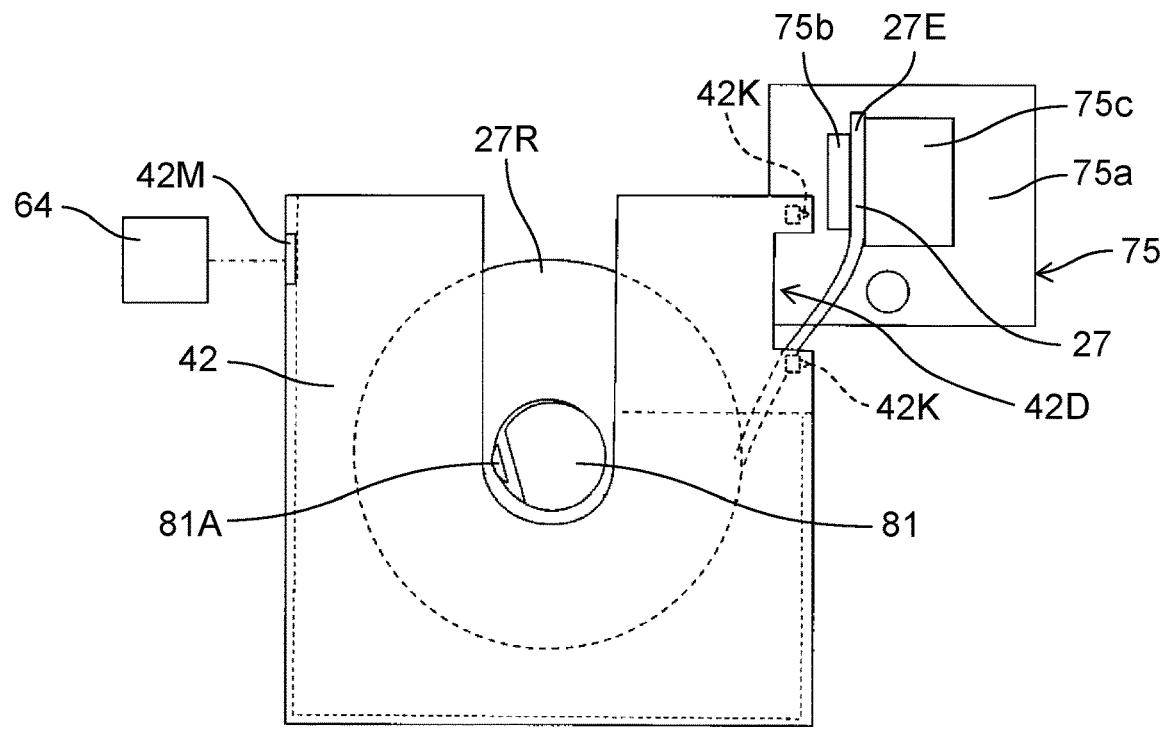
FIG. 14A is an operation explanatory diagram of the carrier tape processing device according to the exemplary embodiment of the present disclosure.
Figure 14B:
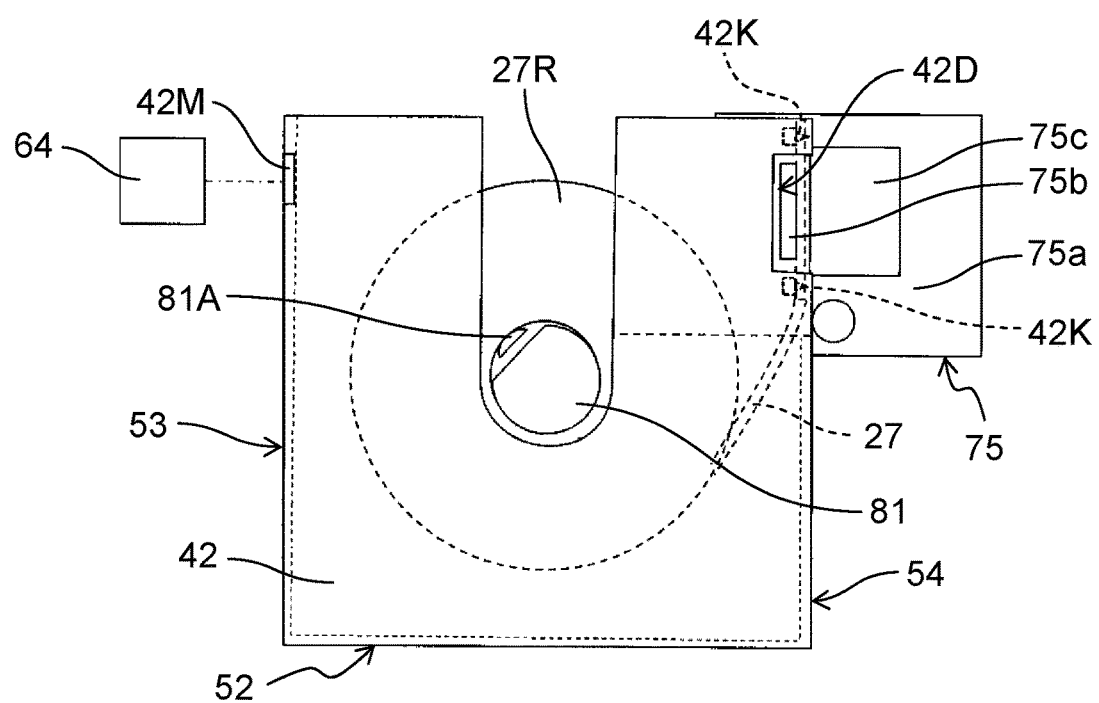
FIG. 14B is an operation explanatory diagram of the carrier tape processing device according to the exemplary embodiment of the present disclosure.
Figure 15:
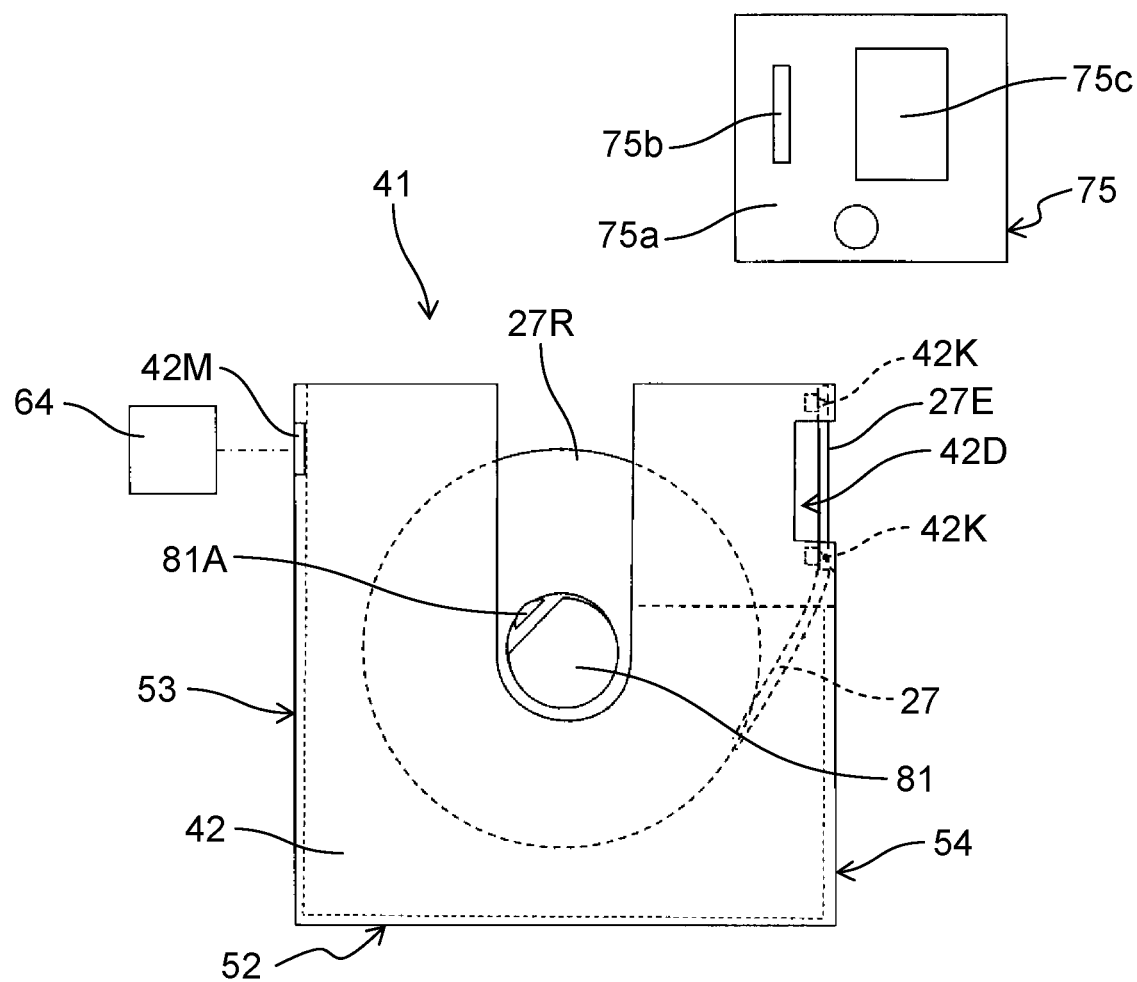
FIG. 15 is an operation explanatory diagram of the carrier tape processing device according to the exemplary embodiment of the present disclosure.

After cutter 76 cuts carrier tape 27, base part 75a of clamper 75 (that is, entire clamper 75) is moved by clamper moving unit 75K (FIG. 7) while cut end part 27E (FIG. 14A), which is the end part opposite to tip end part 27T of carrier tape 27, is clamped by two clamp members 75b, 75c. Then, clamp member 75b enters cutout part 42D provided in case 42 (FIG. 14A→FIG. 14B), whereby cut end part 27E of carrier tape 27 is set (fixed) to tape tip end holding part 42K provided in case 42 (FIG. 14B. See also FIG. 5B). Then, after the clamping of carrier tape 27 by clamper 75 is released, base part 75a of clamper 75 is moved horizontally in a direction away from case 42 to extract clamp member 75b from cutout part 42D, and thereafter, base part 75a is moved (retracted) above case 42 (FIG. 14B→FIG. 15). As a result, roll body 27R of carrier tape 27 is formed in case 42.

As described above, in the present exemplary embodiment, clamper 75 and clamper moving unit 75K constitute carrier tape end setting unit 75S in which the end part (cut end part 27E) on the opposite side to tip end part 27T of carrier tape 27 cut by cutter 76 is set in tape tip end holding part 42K provided in case 42.

Shaft member extracting unit 77 extracts shaft member 81 from roll body 27R created by roll body creating unit 73. Shaft member extracting unit 77 includes a mechanism for moving shaft member 81 in a thickness direction of created roll body 27R. When shaft member extracting unit 77 moves shaft member 81 in the thickness direction of roll body 27R, the movement of roll body 27R is hindered by side wall 51 of case 42, so that shaft member 81 is extracted from roll body 27R. As a result, roll body 27R created by roll body creating unit 73 is stored in case 42.

Handy scanner 63 is a device that optically reads an identifier such as a barcode. Handy scanner 63 is operated by an operator to read component information from the identifier of code label 61L attached to reel 61R of carrier tape supply unit 61. Here, the "component information" is information regarding component BH stored in carrier tape 27 wound around reel 61R of carrier tape supply unit 61, and may include at least one of a type of component BH, a component name, characteristics, a date of manufacture, a manufacturer, an expiration date, the number of components, and access information (URL or the like) for accessing these pieces of information.

As described above, in the present exemplary embodiment, handy scanner 63 is a component information acquisition unit that acquires component information that is information regarding components stored in carrier tape 27. Note that, when reel 61R has a radio tag storing the component information, a non-contact reader having a function of reading the information recorded in the radio tag in a non-contact manner may be used as the component information acquisition unit instead of handy scanner 63.

Writing unit 64 writes information in radio tag 42M of case 42 held by case holding unit 71 by radio communication. The information written in radio tag 42M by writing unit 64 is the component information acquired (read) through handy scanner 63 and the identification information.

Here, the "identification information" is information used to identify component BH stored in one roll body 27R used in component mounting system 1 from component BH stored in another roll body 27R. The identification information includes, for example, a serial number issued in a factory in which component mounting system 1 is installed. In the present exemplary embodiment, as will be described later, the identification information is generated (issued) by management computer 6 when roll body 27R of carrier tape 27 is generated. Further, the identification information is also used as management information for managing case 42. That is, the identification information is used for both the purpose of identifying roll body 27R and the purpose of identifying case 42.

Next, storage warehouse 4 will be described. Storage warehouse 4 stores roll body 41 in a case. Roll body 41 in a case referred to herein includes not only roll body 41 in a case just manufactured by carrier tape processing device 3 but also in-use roll body 41 in a case that has been used in component mounting device 14 and returned halfway.

Figure 16:
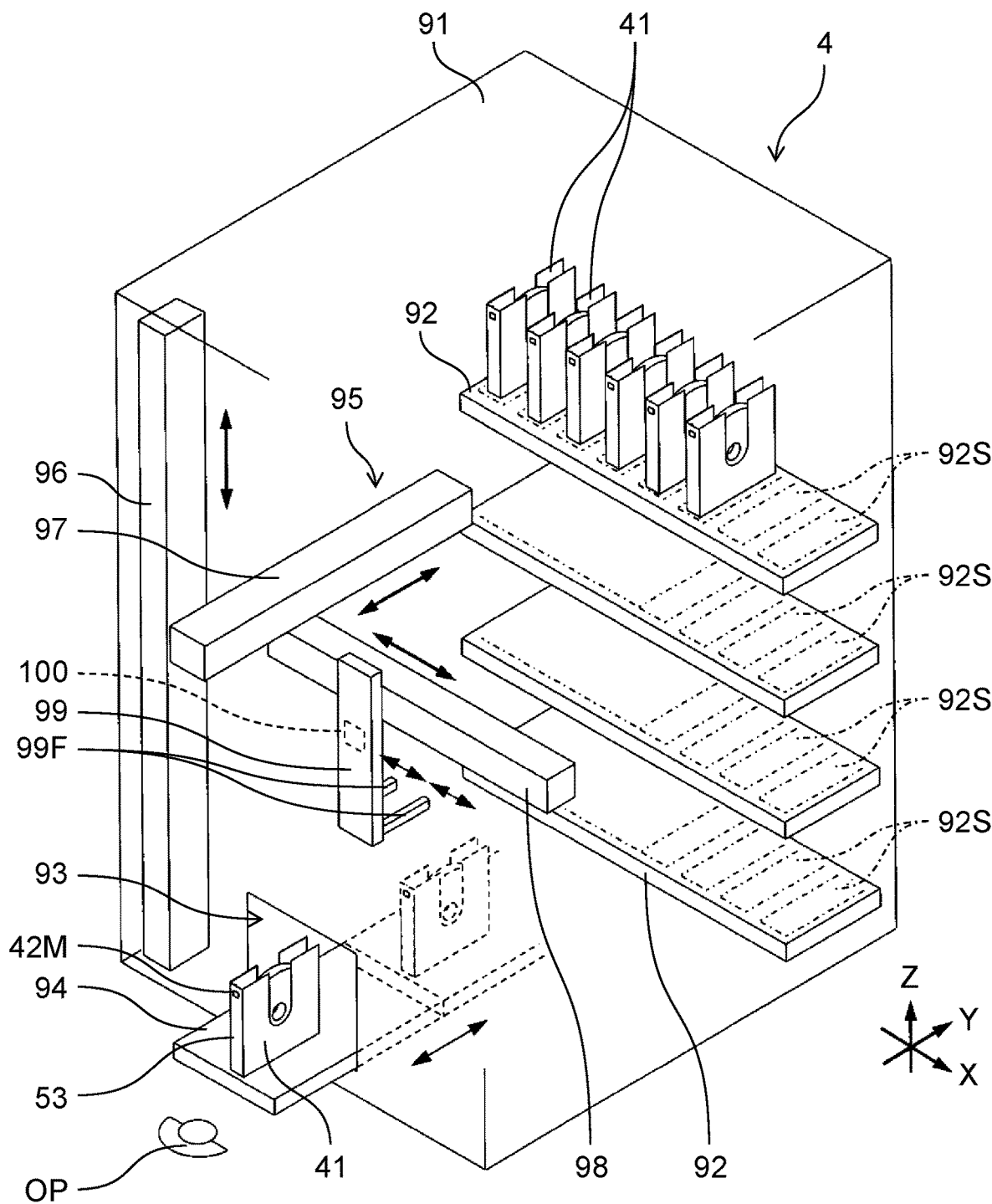
FIG. 16 is a perspective view of a storage warehouse according to the exemplary embodiment of the present disclosure.

In FIG. 16, storage warehouse 4 has a plurality of shelf parts 92 (storage parts) in housing 91. Inlet 93 is provided below a front surface of housing 91, and moving table 94 that performs an operation of protruding to the outside of housing 91 (a front side of operator OP) through inlet 93 and an operation of retracting to the inside of housing 91 (a back side as viewed from operator OP) is provided inside housing 91. Moving table 94 is overhung to the front side of operator OP when roll body 41 in a case is stored in storage warehouse 4, and is drawn to the back side when roll body 41 in a case placed on moving table 94 is housed in housing 91.

A plurality of storage positions 92S for storing (placing) roll body 41 in a case are determined in advance in each of the plurality of shelf parts 92 provided in storage warehouse 4. That is, in the present exemplary embodiment, each shelf part 92 is a storage part including a plurality of storage positions 92S for storing case 42 (that is, roll body 41 in a case) storing roll body 27R.

In FIG. 16, case transfer mechanism 95 is provided in housing 91. Case transfer mechanism 95 includes Z-axis table 96 extending in the vertical direction (referred to as the Z-axis direction), Y-axis table 97 extending in the front-rear direction (referred to as the Y-axis direction) as viewed from operator OP and moved in the vertical direction by Z-axis table 96, X-axis table 98 extending in the lateral direction (referred to as the X-axis direction) as viewed from operator OP and moved in the front-rear direction by Y-axis table 97, and transfer head 99 moved in the X-axis direction by X-axis table 98.

Case transfer mechanism 95 moves transfer head 99 three-dimensionally by the movement operation of Y-axis table 97 in the Z-axis direction by Z-axis table 96, the movement of X-axis table 98 in the Y-axis direction by Y-axis table 97, and the movement of transfer head 99 in the X-axis direction by X-axis table 98. Transfer head 99 includes two fingers 99F arranged in the X-axis direction.

Phase head 99 can bring two fingers 99F close to or away from each other in the X-axis direction. When two fingers 99F are actuated to close with roll body 41 in a case positioned between two fingers 99F, roll body 41 in a case is gripped by two fingers 99F (i.e., by transfer head 99).

In FIG. 16, transfer head 99 is provided with non-contact reader 100 in which an imaging visual field is directed in a depth direction as viewed from operator OP. Non-contact reader 100 faces radio tag 42M provided in case 42 of roll body 41 in a case at a position where transfer head 99 grips roll body 41 in a case.

Non-contact reader 100 reads information written in radio tag 42M (component information and identification information of component BH stored in roll body 27R) by radio communication in a state of facing radio tag 42M. In the present exemplary embodiment, non-contact reader 100 functions as an identification information reading unit that reads identification information written in radio tag 42M as a storage unit. When reading the information written in radio tag 42M of roll body 41 in a case, non-contact reader 100 stores the read information in management computer 6 (described later).

A unique address is given to each storage position 92S defined in each of the plurality of shelf parts 92. In the present exemplary embodiment, when roll body 41 in a case is stored (placed) in storage position 92S, information in which information (component information) on component BH stored in roll body 27R (carrier tape 27) of roll body 41 in a case is associated (so-called associated) with identification information of roll body 41 in a case is stored in management computer 6. Further, information in which the component information and the information on storage position 92S (storage position information) are associated with each other is stored in management computer 6 (described later). As a result, management computer 6 can grasp which storage position 92S of storage warehouse 4 stores which component BH in which roll body 41 in a case is stored.

Figure 17:
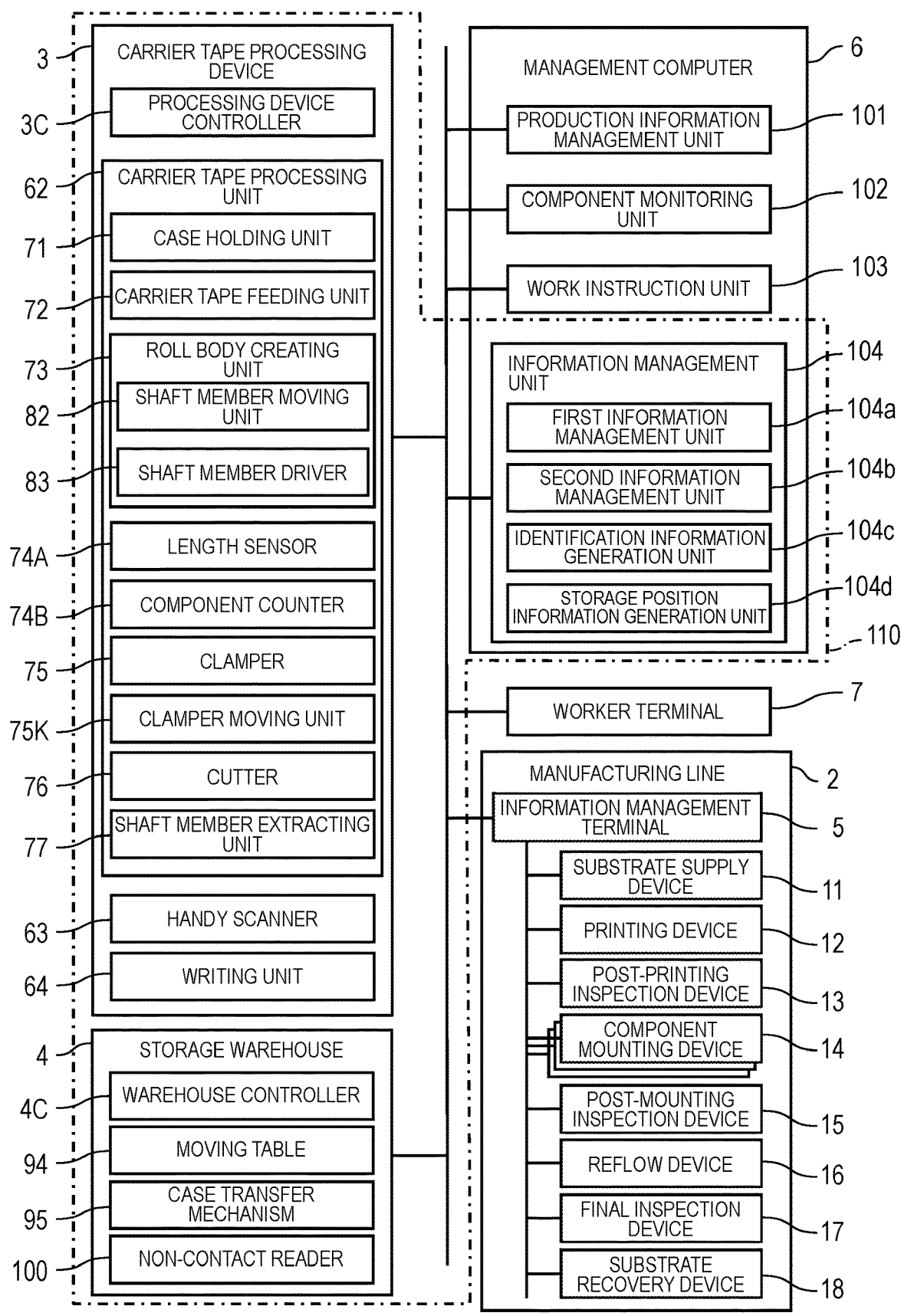
FIG. 17 is a block diagram illustrating a control system of the component mounting system according to the exemplary embodiment of the present disclosure.

FIG. 17 is a block diagram illustrating a control system in entire component mounting system 1. As illustrated in FIG. 17, management computer 6 includes production information management unit 101, component monitoring unit 102, work instruction unit 103, and information management unit 104. Production information management unit 101 stores production plan data in component mounting system 1. Component monitoring unit 102 monitors the number of remaining components BH in manufacturing line 2. When a component shortage is predicted, component monitoring unit 102 transmits the fact to work instruction unit 103.

Work instruction unit 103 instructs manufacturing line 2 and operator OP to perform work at the time of model switching based on the production plan data stored in production information management unit 101, and instructs storage warehouse 4 to deliver component BH to be used in production of the next model. Work instruction unit 103 issues a work instruction (specifically, an instruction to storage warehouse 4 to dispense the component for replenishment and an instruction to operator OP to perform the component replenishment work) based on the information from component monitoring unit 102.

Information management unit 104 includes first information management unit 104a, second information management unit 104b, identification information generation unit 104c, and storage position information generation unit 104d (FIG. 17). First information management unit 104a manages the component information, and second information management unit 104b manages information (storage position information) of storage position 92S of component BH in storage warehouse 4. Specifically, first information management unit 104a stores the generated component information and identification information of roll body 27R in association with each other. Further, second information management unit 104b stores the generated identification information on roll body 27R and the information on storage position 92S (storage position information) in association with each other.

Identification information generation unit 104c generates (issues) the identification information on roll body 27R when shaft member extracting unit 77 extracts shaft member 81 from roll body 27R in carrier tape processing device 3. When roll body 41 in a case is stored in storage warehouse 4, storage position information generation unit 104d specifies storage position 92S of roll body 41 in a case and generates the storage position information.

As illustrated in FIG. 17, carrier tape processing device 3 includes processing device controller 3C. Processing device controller 3C controls carrier tape processing unit 62 (case holding unit 71, carrier tape feeding unit 72, shaft member moving unit 82 and shaft member driver 83 of roll body creating unit 73, measurement unit 74 (length sensor 74A, component counter 74B), clamper 75, clamper moving unit 75K, cutter 76, shaft member extracting unit 77), handy scanner 63, and writing unit 64 included in carrier tape processing device 3. As illustrated in FIG. 17, storage warehouse 4 includes warehouse controller 4C. Warehouse controller 4C controls moving table 94, case transfer mechanism 95, and non-contact reader 100 included in storage warehouse 4.

Figure 18:
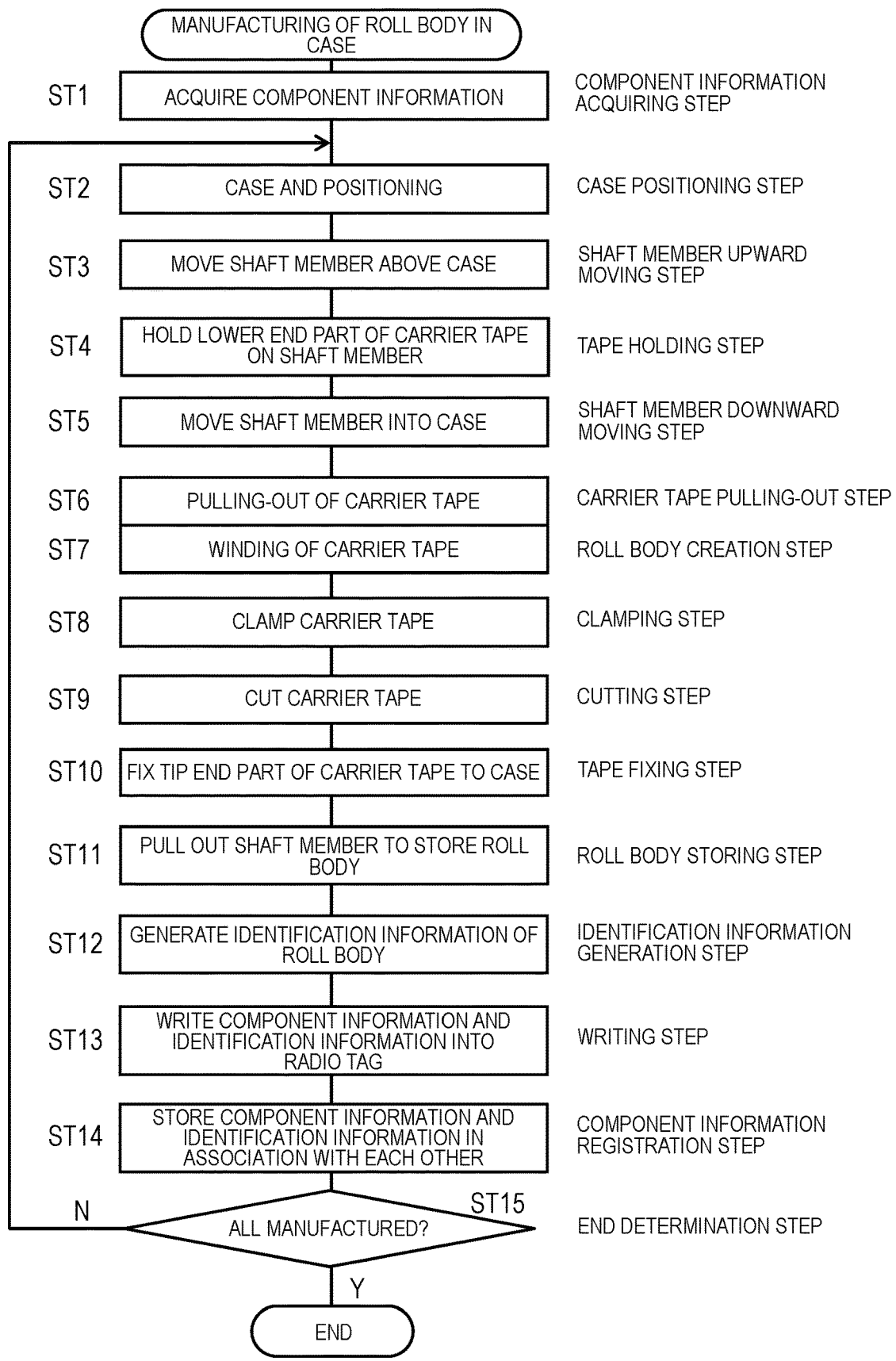
FIG. 18 is a flowchart illustrating a flow of work of manufacturing the roll body in a case by the carrier tape processing device according to the exemplary embodiment of the present disclosure.

Next, a flow of a manufacturing operation (a processing operation of carrier tape 27) of roll body 41 in a case by carrier tape processing device 3 will be described with reference to a flowchart illustrated in FIG. 18. First, processing device controller 3C of carrier tape processing device 3 acquires the component information of carrier tape 27 wound around reel 61R of carrier tape supply unit 61 (component information acquisition step in step ST1). Here, operator OP acquires the component information by reading the identifier of code label 61L attached to reel 61R of carrier tape supply unit 61 by handy scanner 63 (FIG. 7), but another method may be used. For example, operator OP may perform an input corresponding to the content of code label 61L from an input device (not illustrated) connected to processing device controller 3C.

When the component information of carrier tape 27 wound around reel 61R of carrier tape supply unit 61 is acquired in step ST1, processing device controller 3C operates case holding unit 71 to position case 42 (empty case 42) in which roll body 27R is to be stored at the working position below reel 61R (case positioning step in step ST2). Then, when case 42 is positioned at the working position, processing device controller 3C operates shaft member moving unit 82 to move shaft member 81 to a predetermined position above empty case 42 held by case holding unit 71 (that is, the working position) (shaft member upward moving step in step ST3. FIG. 8).

After moving shaft member 81 to a predetermined position above case 42 in step ST3, processing device controller 3C causes carrier tape feeding unit 72 to feed carrier tape 27 downward while rotating reel 61R to feed carrier tape 27 downward, and causes shaft member 81 to hold tip end part 27T of carrier tape 27 (tape holding step in step ST4). In this tape holding step, tip end part 27T of carrier tape 27 is held by a robot or the like (not illustrated), and then tip end part 27T of carrier tape 27 is inserted between shaft member 81 and chuck part 81A. Thereafter, by operating chuck part 81A, tip end part 27T of carrier tape 27 is sandwiched between shaft member 81 and chuck part 81A (FIG. 9→FIG. 10).

When tip end part 27T of carrier tape 27 is held by shaft member 81, processing device controller 3C operates shaft member moving unit 82 to move shaft member 81 so as to be positioned at the in-case position of case 42 positioned at the working position by case holding unit 71 (shaft member downward moving step in step ST5. FIG. 10). Then, when shaft member 81 is positioned in the case, processing device controller 3C causes carrier tape feeding unit 72 to pull out carrier tape 27 downward from carrier tape supply unit 61 (carrier tape pulling-out step in step ST6), and causes shaft member driver 83 to rotate shaft member 81, thereby winding carrier tape 27 around shaft member 81 to create roll-shaped roll body 27R (roll body creation step in step ST7). FIG. 11).

In the carrier tape pulling-out step in step ST6 and the roll body creation step in step ST7, processing device controller 3C rotates shaft member 81 to start winding carrier tape 27 around shaft member 81, and then measures the length of pulled out carrier tape 27 by length sensor 74A constituting measurement unit 74 (alternatively, the number of pulled out components BH is measured by component counter 74B constituting measurement unit 74). Then, processing device controller 3C stops the rotation of shaft member 81 when the length of carrier tape 27 pulled out from carrier tape supply unit 61 reaches a predetermined length (alternatively, the number of components BH pulled out from carrier tape supply unit 61 has reached a predetermined number).

When roll body 27R is created, processing device controller 3C clamps carrier tape 27 with clamper 75 (clamping step in step ST8. FIG. 11→FIG. 12). Then, cutter 76 is operated to cut carrier tape 27 (cutting step in step ST9. FIG. 12→FIG. 13).

As described above, in the present exemplary embodiment, processing device controller 3C of carrier tape processing device 3 functions as a cutting controller that causes cutter 76 as a cutting unit to execute cutting of carrier tape 27 when measurement unit 74 measures the length of carrier tape 27 designated in advance or the number of components BH designated in advance. Here, processing device controller 3C causes cutter 76 to cut carrier tape 27 when length sensor 74A measures the length of carrier tape 27 designated in advance, but may cause cutter 76 to cut carrier tape 27 when component counter 74B measures the number of components designated in advance.

After operating cutter 76 to cut carrier tape 27, processing device controller 3C operates clamper moving unit 75K to fix cut end part 27E of carrier tape 27 cut by cutter 76 to tape tip end holding part 42K provided in case 42 in the manner described above (tape fixing step in step ST10. FIG. 14A→FIG. 14B).

After fixing cut end part 27E of carrier tape 27 to case 42 in step ST10, processing device controller 3C moves base part 75a of clamper 75 upward (FIG. 15), and then operates shaft member moving unit 82 to extract shaft member 81 from case 42 (from roll body 27R). As a result, roll body 27R created by winding carrier tape 27 around shaft member 81 is stored in case 42 (roll body storing step of step ST11). Through this roll body storing step, one roll body 27R is stored in one empty case 42.

Here, a series of steps from the roll body creation step (step ST7) to the roll body storing step (step ST11) is a carrier tape processing step in which carrier tape 27 pulled out in the carrier tape pulling-out step is rolled and stored in case 42.

When extracting shaft member 81 from case 42 in step ST11, processing device controller 3C requests identification information generation unit 104c of management computer 6 to generate the identification information on roll body 27R in case 42. Then, identification information generation unit 104c requested to generate the identification information from processing device controller 3C generates the identification information on roll body 27R in case 42 (identification information generation step in step ST12).

When the identification information is generated by identification information generation unit 104c in step ST12, processing device controller 3C receives the generated identification information. Then, writing unit 64 writes the component information acquired in step ST1 and the identification information generated in step ST12 in radio tag 42M attached to case 42 (case 42 in which roll body 27R is stored) (writing step in step ST13).

After writing the component information and the identification information in radio tag 42M of case 42, processing device controller 3C transmits the information written in radio tag 42M (the component information and the identification information on roll body 27R) to management computer 6, and causes first information management unit 104a of management computer 6 to store the information (the component information and the identification information). As a result, roll body 27R in case 42 is registered in management computer 6 in a state where the identification information, which is information unique to roll body 27R, is associated with the component information, which is information on component BH stored in roll body 27R (component information registration step in step ST14).

After writing the information on roll body 27R in first information management unit 104a of management computer 6, processing device controller 3C determines whether or not all roll bodies 41 in a case to be manufactured have been manufactured (end determination step in step ST15). When it is determined that not all roll bodies 41 in a case have been manufactured yet, the process returns to step ST2 to newly manufacture roll body 41 in a case, and when it is determined that all roll bodies 41 in a case have been manufactured, the manufacturing of roll body 41 in a case by carrier tape processing device 3 (processing operation of carrier tape 27) is terminated.

Figure 19:
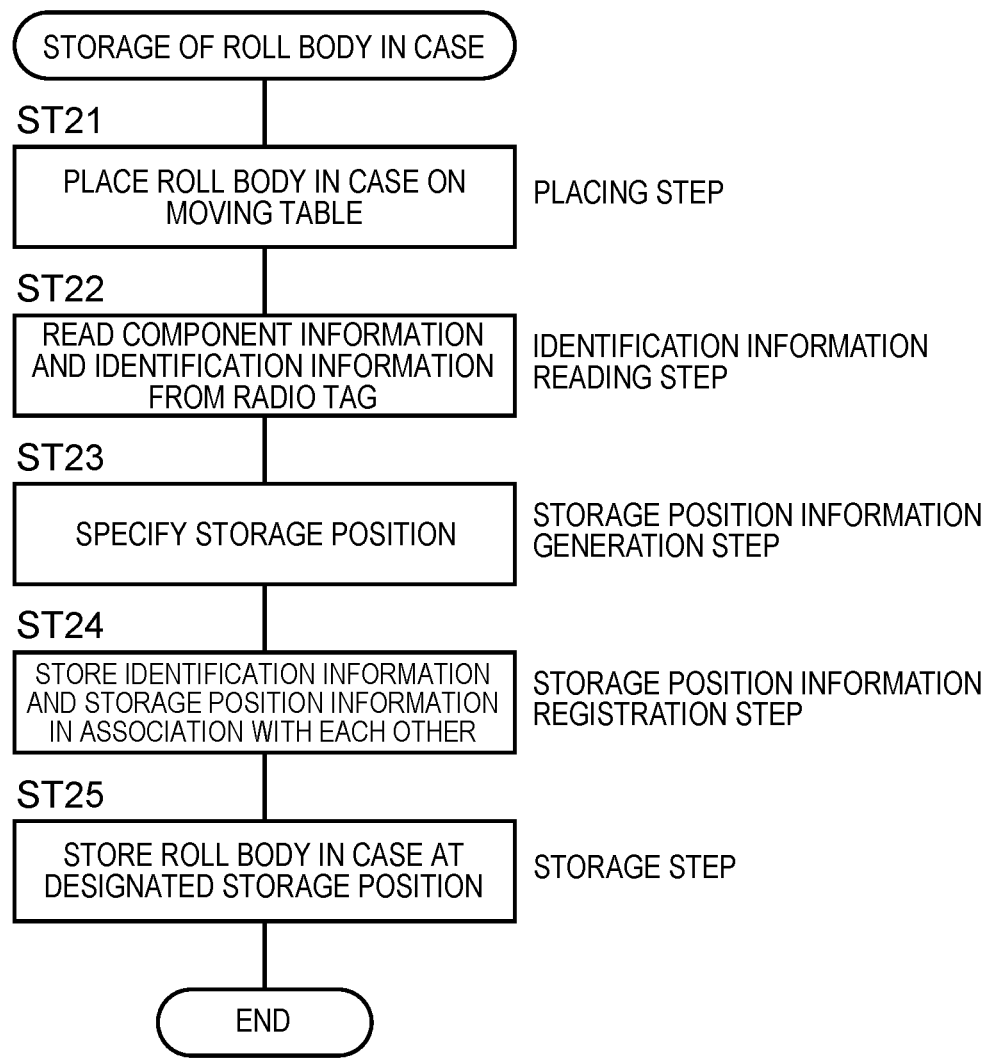
FIG. 19 is a flowchart illustrating a flow of work of storing the roll body in a case in the storage warehouse according to the exemplary embodiment of the present disclosure.

Next, a flow of an operation of storing roll body 41 in a case will be described with reference to a flowchart illustrated in FIG. 19. First, warehouse controller 4C of storage warehouse 4 moves moving table 94 to the front side from inlet 93 provided in housing 91. Then, operator OP (or a mobile robot (not illustrated)) places roll body 41 in a case on moving table 94 (placing step in step ST21. FIG. 19). At this time, roll body 41 in a case is placed on moving table 94 in an attitude in which upper opening 55 faces upward and front wall 53 faces the front side (the side of operator OP). As a result, radio tag 42M provided in case 42 faces the front side (FIG. 16).

When roll body 41 in a case is placed on moving table 94, warehouse controller 4C operates moving table 94 to draw roll body 41 in a case into housing 91. When roll body 41 in a case is drawn into housing 91, warehouse controller 4C moves transfer head 99 to the front side of roll body 41 in a case placed on moving table 94. Then, two fingers 99F are operated to close to cause transfer head 99 to grip roll body 41 in a case. At this time, non-contact reader 100 provided in transfer head 99 faces radio tag 42M provided in case 42 of roll body 41 in a case, and non-contact reader 100 reads the identification information written in radio tag 42M (identification information reading step in step ST22).

When non-contact reader 100 reads the identification information written in radio tag 42M, warehouse controller 4C transmits the identification information read by non-contact reader 100 to management computer 6. Then, management computer 6 that has received the transmission of the identification information from warehouse controller 4C specifies storage position 92S in storage warehouse 4 of roll body 41 in a case (roll body 41 in a case from which non-contact reader 100 has read the identification information) corresponding to the identification information in storage position information generation unit 104d, and generates the storage position information (the storage position information generation step in step ST23). Storage position 92S is specified by being arbitrarily selected from storage positions 92S that are in an empty state at that time or according to a predetermined rule.

When storage position information generation unit 104d generates the storage position information in step ST23, management computer 6 causes second information management unit 104b to store the generated storage position information and the identification information of roll body 41 in a case corresponding to the storage position information in association with each other. As a result, for roll body 41 in a case to be stored in storage warehouse 4, the identification information, which is unique information of roll body 27R, and the information of the storage position (storage position information) of roll body 41 in a case including roll body 27R in storage warehouse 4 are registered in management computer 6 in association with each other (storage position information registration step in step ST24).

Management computer 6 causes second information management unit 104b to store the storage information and the identification information of roll body 41 in a case placed on moving table 94 in association with each other. Then, management computer 6 operates case transfer mechanism 95 to transfer and store roll body 41 in a case placed on moving table 94 to storage position 92S corresponding to the storage position information (storage step in step ST25). Accordingly, the storage operation of roll body 41 in a case is completed.

As described above, in the present exemplary embodiment, roll body 27R formed by rolling carrier tape 27 pulled out from reel 61R of carrier tape supply unit 61 is stored in case 42, so that roll body 27R can be handled as roll body 41 in a case. Roll body 41 in a case can be made compact by making the dimension in the width direction smaller than that of the roll body with a reel, and the reel does not remain as waste after roll body 27R is used up (that is, carrier tape 27), so that workability is good. Further, case 42 itself is inexpensive, and can be reused (reused) differently from the reel, so that the cost can be reduced also in this respect.

Furthermore, in the present exemplary embodiment, radio tag 42M as a storage unit capable of storing component information is provided in case 42, and the component information of carrier tape 27 wound around reel 61R can be written and stored in radio tag 42M. In addition, since the component information and the identification information, which is information unique to roll body 27R, can be stored in association with each other, the component information can be managed in each unit of roll body 41 in a case.

In component mounting system 1 described above, processing device controller 3C of carrier tape processing device 3, carrier tape processing unit 62, handy scanner 63 as a component information reading unit, writing unit 64, storage warehouse 4 (warehousing controller 4C, shelf parts 92, case transfer mechanism 95, and non-contact reader 100 as identification information reading unit), and information management unit 104 (first information management unit 104a, second information management unit 104b, identification information generation unit 104c, and storage position information generation unit 104d) constitute component management device 110 (FIG. 17).

In the management work (component management method) of component BH using component management device 110, first, the component information is acquired (component information acquisition step), the identification information is generated (identification information generation step), the component information and the identification information are written in radio tag 42M provided in case 42 (writing step), and the written component information and the identification information are associated with each other and stored in first information management unit 104a (component information registration step). The identification information reading unit (non-contact reader 100) reads the identification information written in radio tag 42M (identification information reading step), the storage position information generation unit generates the storage position information by specifying storage position 92S (storage position information generation step), and second information management unit 104b stores the identification information and the storage position information in association with each other (storage position information registration step).

According to such a component management method, since the component information and the identification information of roll body 41 in a case are stored in association with each other, and the identification information and the storage position information of roll body 41 in a case are stored in association with each other, it is possible to smoothly store and take out roll body 41 in a case in storage warehouse 4. Therefore, according to component management device 110 (component management method) in the present exemplary embodiment, it is possible to easily and efficiently store and unload components BH.

Figure 20:
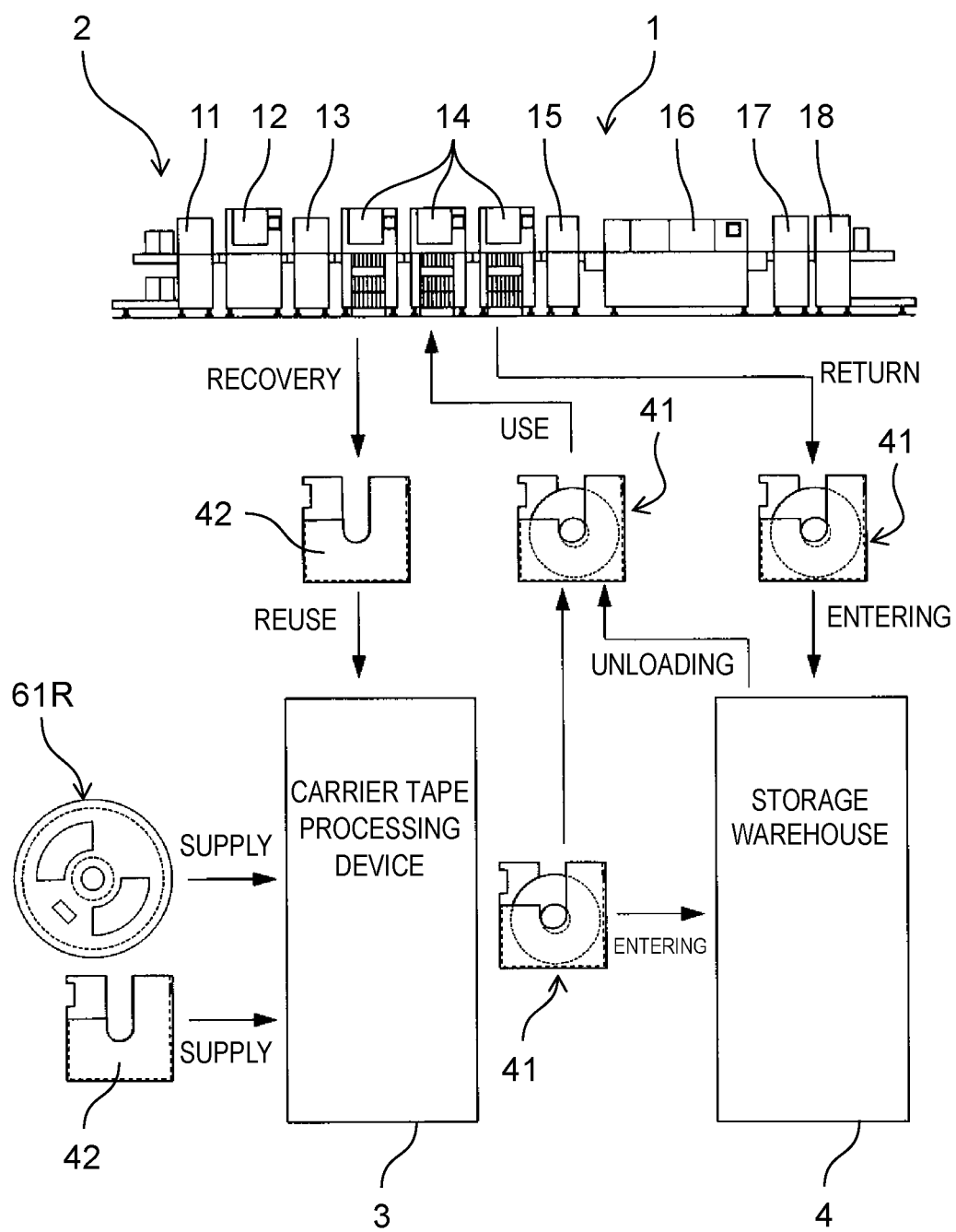
FIG. 20 is a diagram illustrating an image of an operation of the roll body in a case according to the exemplary embodiment of the present disclosure.

FIG. 20 illustrates an image of an operation of roll body 41 in a case in component mounting system 1 in the present exemplary embodiment. As illustrated in this drawing, roll body 41 in a case in the present exemplary embodiment is manufactured by supplying reel 61R around which carrier tape 27 is wound and case 42 to carrier tape processing device 3. A part of roll body 41 in a case manufactured by carrier tape processing device 3 is sent to manufacturing line 2 to be used, and the other part is stored (stored) in storage warehouse 4. Roll body 41 in a case stored in storage warehouse 4 is delivered therefrom and sent to manufacturing line 2 to be used. Case 42 caused by carrier tape 27 of roll body 41 in a case being used up in manufacturing line 2 is recovered and supplied to carrier tape processing device 3 to be reused for manufacturing of new roll body 41 in a case. A part of roll body 41 in a case sent to manufacturing line 2 in a state where carrier tape 27 has not been used up is returned to storage warehouse 4 and stored (received).

As described above, in carrier tape processing device 3 (carrier tape processing method) according to the present exemplary embodiment, roll body 27R formed by rolling carrier tape 27 pulled out from reel 61R of carrier tape supply unit 61 is stored in case 42, so that roll body 27R can be handled as roll body 41 in a case. Roll body 41 in a case can be made compact by making the dimension in the width direction smaller than that of the roll body with a reel, and the reel does not remain as waste after roll body 27R is used up (that is, carrier tape 27), so that workability is good.

Further, case 42 itself is inexpensive, and can be reused (reused) differently from the reel, so that the cost can be reduced also in this respect. Therefore, according to carrier tape processing device 3 (carrier tape processing method) of the present exemplary embodiment, a component supply form without a reel can be realized with an inexpensive configuration.

While the exemplary embodiment of the present disclosure has been described above, the present disclosure is not limited to the above exemplary embodiment, and various modifications and the like can be made. For example, the specific configuration of carrier tape processing unit 62 described in the above-described exemplary embodiment is merely an example, and the configuration is arbitrary as long as carrier tape 27 can be pulled out from carrier tape supply unit 61 and stored in case 42 in a roll shape. In addition, as reel 61R, a reel obtained by winding carrier tape 27 from a generally distributed normal reel may be used. In this case, handy scanner 63 reads the component information not from reel 61R but from an identifier of a normal reel.

INDUSTRIAL APPLICABILITY

To provide a carrier tape processing device and a carrier tape processing method capable of realizing a component supply form without a reel with an inexpensive configuration.

REFERENCE MARKS IN THE DRAWINGS

3: carrier tape processing device
3C: processing device controller (cutting controller)
27: carrier tape
27T: tip end part
27E: cutting end part (opposite end part)
27R: roll body
41: roll body in a case
42: case
61: carrier tape supply unit
62: carrier tape processing unit
64: writing unit
73: roll body creating unit
74: measurement unit
75S: carrier tape end setting unit
76: cutter (cutting unit)
77: shaft member extracting unit
81: shaft member
104: information management unit
104a: first information management unit
104b: second information management unit
104c: identification information generation unit
BH: component

The invention claimed is:

1. A carrier tape processing device comprising:
a carrier tape supply unit that supplies carrier tape storing components;
a carrier tape processing unit that pulls out the carrier tape from the carrier tape supply unit, forms the carrier tape into a roll shape, and stores the carrier tape in a case wherein the carrier tape processing unit includes a shaft member configured to directly hold a tip end part of the carrier tape;
a roll body creating unit that creates a roll body in a roll shape by rotating the shaft member to wind the carrier tape around the shaft member; and
a shaft member extracting unit that extracts the shaft member from the roll body created by the roll body creating unit.

2. The carrier tape processing device according to claim 1, wherein the carrier tape processing unit includes a cutting unit configured to cut the carrier tape pulled out from the carrier tape supply unit.

3. The carrier tape processing device according to claim 2, wherein
the carrier tape processing unit includes:
a measurement unit configured to measure a length of the carrier tape pulled out from the carrier tape supply unit or a number of the components pulled out from the carrier tape supply unit; and
a cutting controller configured to cause the cutting unit to cut the carrier tape when the measurement unit measures a length of the carrier tape designated in advance or a number of the components designated in advance.

4. The carrier tape processing device according to claim 3, wherein the carrier tape processing unit includes a carrier tape end setting unit that sets an end part on an opposite side to the tip end part of the carrier tape cut by the cutting unit to a tape tip end holding part provided in the case.

5. The carrier tape processing device according to claim 1, further comprising a case holding unit that holds one or more cases each being the case and empty,
wherein a single roll body being the roll body is stored in each of the one or more cases.

6. The carrier tape processing device according to claim 1, wherein the shaft member includes a chuck part sandwiching and holding the tip end part of the carrier tape, and is extracted from the roll body by moving in a thickness direction of the roll body.

7. The carrier tape processing device according to claim 1, further comprising a writing unit configured to write information, regarding the components stored in the carrier tape, in a radio tag provided on the case.

8. The carrier tape processing device according to claim 1, wherein the shaft member is removable from the tip end part of the carrier tape stored in the case.

9. A carrier tape processing method comprising:
a carrier tape pulling-out step including pulling out a carrier tape from a carrier tape supply unit that supplies carrier tape storing components; and
a carrier tape processing step including:
forming the carrier tape pulled out in the carrier tape pulling-out step into a roll shape;
storing the carrier tape in a case;
rotating a shaft member configured to directly hold a tip end part of the carrier tape;
creating a roll-shaped roll body by rotating the shaft member holding the tip end part of the carrier tape to wind the carrier tape around the shaft member; and
extracting the shaft member from the roll body.

10. The carrier tape processing method according to claim 9, wherein the carrier tape processing step includes a cutting step of cutting the carrier tape pulled out in the carrier tape pulling-out step.

11. The carrier tape processing method according to claim 10, wherein
the carrier tape processing step includes a measurement step of measuring a length of the carrier tape pulled out in the carrier tape pulling-out step or a number of the components pulled out in the carrier tape pulling-out step and executes the cutting step when the length of the carrier tape designated in advance or the number of the components designated in advance is measured in the measurement step.

12. The carrier tape processing method according to claim 11, wherein the carrier tape processing step includes a carrier tape end setting step of setting an end part on an opposite side to the tip end part of the carrier tape cut in the cutting step to a tape tip end holding part provided in the case.

13. The carrier tape processing method according to claim 9, wherein in a roll body storing step, a single roll body being the roll body is stored in each of cases each being the case and empty.

14. The carrier tape processing method according to claim 9, wherein the shaft member includes a chuck part sandwiching and holding the tip end part of the carrier tape, and is extracted from the roll body by moving in a thickness direction of the roll body.

15. The carrier tape processing method according to claim 9, further comprising a writing step of writing information, regarding the components stored in the carrier tape, in a radio tag provided on the case.

16. The carrier tape processing method according to claim 9, wherein the carrier tape processing step includes removing the shaft member from the tip end part of the carrier tape stored in the case.

* * * * *